United States Patent
Zhang et al.

(10) Patent No.: US 10,983,867 B1
(45) Date of Patent: *Apr. 20, 2021

(54) FINGERPRINT CHANGE DURING DATA OPERATIONS

(71) Applicant: Veritas Technologies LLC, Santa Clara, CA (US)

(72) Inventors: Xianbo Zhang, Plymouth, MN (US); Haigang Wang, Shoreview, MN (US)

(73) Assignee: Veritas Technologies LLC, Santa Clara, CA (US)

( * ) Notice: Subject to any disclaimer, the term of this patent is extended or adjusted under 35 U.S.C. 154(b) by 303 days.

This patent is subject to a terminal disclaimer.

(21) Appl. No.: 15/959,489

(22) Filed: Apr. 23, 2018

Related U.S. Application Data

(63) Continuation of application No. 14/588,008, filed on Dec. 31, 2014, now Pat. No. 9,952,933.

(51) Int. Cl.
| | |
|---|---|
| *G06F 7/00* | (2006.01) |
| *G06F 17/00* | (2019.01) |
| *G06F 11/14* | (2006.01) |
| *G06F 16/22* | (2019.01) |
| *G06F 16/245* | (2019.01) |

(52) U.S. Cl.
CPC .......... *G06F 11/1448* (2013.01); *G06F 16/22* (2019.01); *G06F 16/245* (2019.01)

(58) Field of Classification Search
CPC ..... G06F 11/1448; G06F 16/22; G06F 16/245
USPC ........................................................ 707/645
See application file for complete search history.

(56) References Cited

U.S. PATENT DOCUMENTS

| | | | | |
|---|---|---|---|---|
| 8,315,984 | B2* | 11/2012 | Frandzel | G06F 3/0608 707/661 |
| 8,396,841 | B1* | 3/2013 | Janakiraman | G06F 3/067 707/692 |
| 8,700,873 | B2* | 4/2014 | Cantu | H04L 49/9057 711/165 |
| 9,075,532 | B1* | 7/2015 | Bromley | G06F 3/0608 |
| 9,740,422 | B1* | 8/2017 | Ozdemir | G06F 3/0641 |
| 2005/0091511 | A1* | 4/2005 | Nave | G06Q 30/0241 713/185 |
| 2010/0318812 | A1* | 12/2010 | Auradkar | H04L 9/3073 713/193 |
| 2012/0066229 | A1* | 3/2012 | Carter | G06F 16/137 707/747 |
| 2013/0013618 | A1* | 1/2013 | Heller | G06F 16/174 707/747 |
| 2016/0306703 | A1* | 10/2016 | Patterson | G06F 3/0608 |
| 2016/0344553 | A1* | 11/2016 | Chen | H04L 9/3242 |

* cited by examiner

*Primary Examiner* — Binh V Ho
(74) *Attorney, Agent, or Firm* — Campbell Stephenson LLP

(57) ABSTRACT

Various systems, methods, and processes for caching and referencing multiple fingerprints while data operations are ongoing are disclosed. A first fingerprint is generated based on a first fingerprinting process. The first fingerprint is stored in association with a second fingerprint, which is based on a second fingerprinting process. The first fingerprint and the second fingerprint are associated with the same data segment. Data operations such as a backup operation, a restore operation, or a replication operation can be performed while the conversion of the data segment from the second fingerprint to the first fingerprint is ongoing.

16 Claims, 16 Drawing Sheets

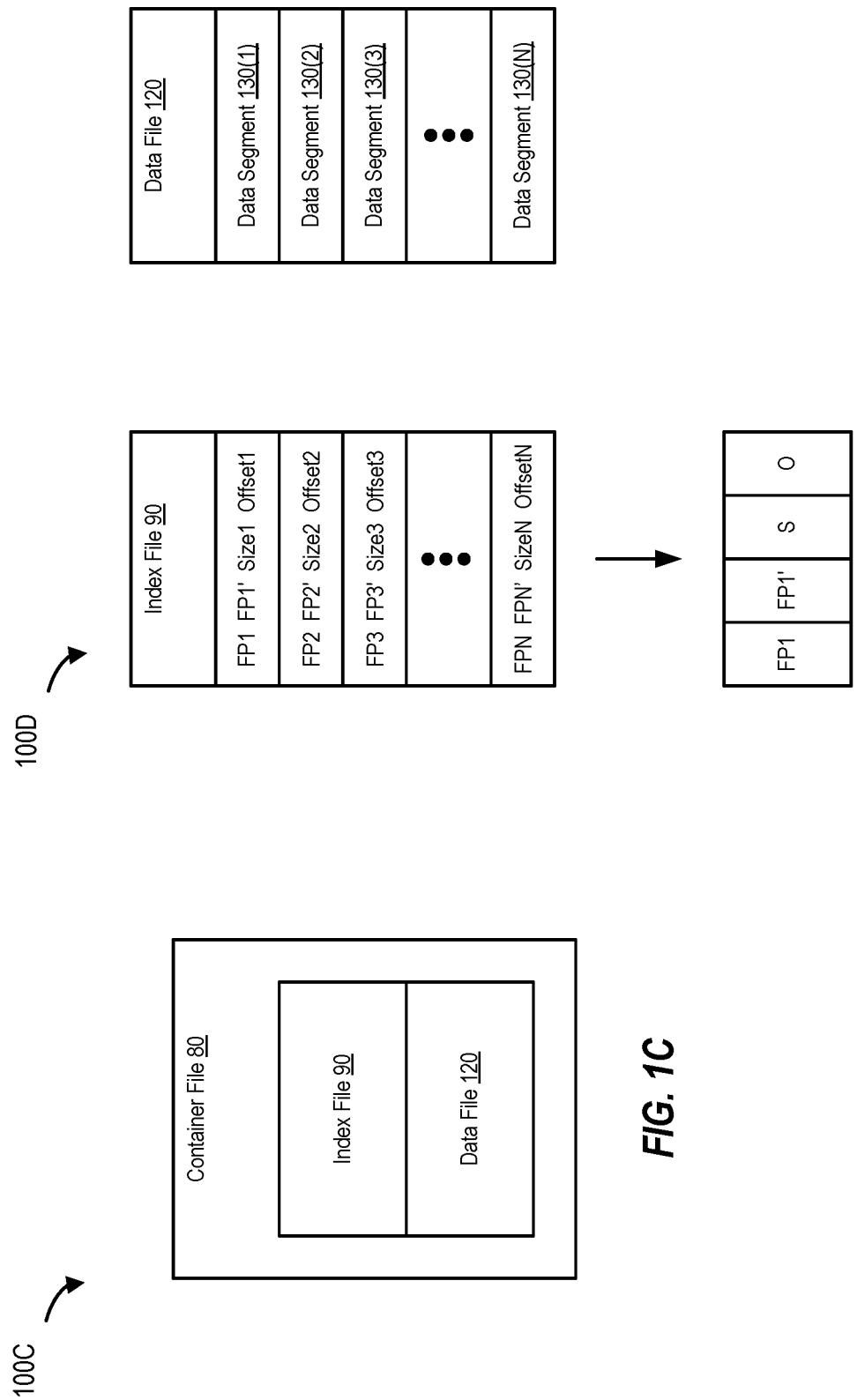

Backup ID List 460

| | Backup ID 465 | | | | Contents 470 | | |
|---|---|---|---|---|---|---|---|
| Client Name 475 | Policy Name 480 | Timestamp 485 | Type 490 | Status 495 | Fingerprint 110 and/or 150 | Size 440 | Offset 450 |
| Entry Client1 | BUpolicy1 | 01/01/2014, 01:59 | Full | Active | SO1: FP1,FP1'<br>SO2: FP2,FP2'<br>SO3: FP3,FP3' | size1<br>size2<br>size3 | containerID1<br>containerID2<br>containerID2 |
| Entry Client1 | BUpolicy1 | 01/15/2014, 03:09 | Inc | Active | SO1: FP1,FP1'<br>SO2: FP2,FP2'<br>SO4: FP4,FP4' | size1<br>size2<br>size4 | containerID1<br>containerID2<br>containerID4 |
| Entry Client1 | BUpolicy2 | 01/30/2014, 02:15 | Full | Active | SO1: FP1,FP1'<br>SO5: FP5' | size1<br>size5 | containerID1<br>containerID10 |
| ••• | | | | | | | |
| Entry ClientN | BUpolicyN | 01/30/2014, 02:15 | Inc | Active | SO101: FP7'<br>SO111: FP9,FP9' | size100<br>size100 | containerID100<br>containerID100 |

FINGERPRINT CHANGE DURING DATA OPERATIONS

CROSS-REFERENCE TO RELATED APPLICATIONS

The present patent application is a continuation of U.S. patent application Ser. No. 14/588,008, filed on Dec. 31, 2014, entitled "FINGERPRINT CHANGE DURING DATA OPERATIONS" which is incorporated by reference herein in its entirety and for all purposes.

BACKGROUND OF THE INVENTION

Field of the Invention

This invention relates to deduplication system backups and, more particularly, to caching multiple fingerprints to improve deduplication backup performance.

Description of the Related Art

A fingerprinting algorithm is an algorithm that maps a data segment to a shorter string bit. A fingerprint uniquely identifies the data segment and is typically used to avoid the comparison and transmission of bulky data. For example, a web browser or proxy server can check whether a file has been modified, by fetching only the file's fingerprint and comparing the fetched fingerprint with a previously-fetched copy. Therefore, a fingerprint may be used for data deduplication.

An example of a fingerprint is a hash value. Hashing/fingerprinting algorithms such as Message-Digest Algorithm 5(MD5), Secure Hash Algorithm 1 (SHA-1), and Secure Hash Algorithm 256 (SHA-256) and the like can be used to generate hash values. However, a fingerprinting algorithm can be identified (e.g., by hackers) and therefore, may have to be replaced with an alternate fingerprinting algorithm to preserve the security and integrity of backed up data. As a result, data segments associated with the old (replaced) fingerprinting algorithm have to be recalculated based on the new fingerprinting algorithm.

In big data installations, recalculating existing data segments based on a new fingerprinting algorithm before a system can be considered operational can be prohibitive. Recalculating and converting data segments based on the new fingerprinting algorithm can take a considerable amount of time and may consume significant computing resources. Therefore, it can be desirable to reduce the performance impact on ongoing data operations such as data backup, data restore, and data replication when a fingerprinting algorithm has to be changed.

SUMMARY OF THE INVENTION

Various systems, methods, and processes for caching and referencing multiple fingerprints are disclosed. For example, one method involves generating a first fingerprint. The first fingerprint is generated based on a first fingerprinting process. The method also involves storing the first fingerprint in association with a second fingerprint. The second fingerprint is based on a second fingerprinting process, and the first fingerprint and the second fingerprint are associated with the same data segment.

In one embodiment, the method involves recalculating the second fingerprint based on the first fingerprinting process. The second fingerprint is previously calculated based on the second fingerprinting process, and is stored both in an index file and in a cache. Upon recalculating the second fingerprint based on the first fingerprinting algorithm, the method stores the first fingerprint and the second fingerprint in the index file and in the cache. In this example, the first fingerprint is stored along with the second fingerprint locally in the index file and remotely in the cache.

In another embodiment, the method involves retrieving a data object from a container file that includes the second fingerprint of a last full backup. The second fingerprint is stored locally in the container file that includes the index file. The data segment is queried against the last full backup to determine whether a data item associated with the data segment is also associated with the second fingerprint. In this example, querying the data segment against the last full backup indicates (or fails to indicate) that the data item associated with the data segment is also associated with the second fingerprint.

In some embodiments, a new backup operation references the second fingerprint stored locally in the index file and remotely in the cache. The cache is cleared after the new backup operation.

In other embodiments, the index file is modified based on the recalculating such that the modification stores the first fingerprint associated with the data segment calculated with the first fingerprinting process along with the second fingerprint associated with the same data segment in the index file. A conversion of the data segments associated with the second fingerprint to first fingerprints is started based on the first fingerprinting process. In this example, the conversion is performed by accessing the modified index file. The method also performs another backup operation, a restore operation, or a replication operation while the conversion of the data segments is ongoing.

BRIEF DESCRIPTION OF THE DRAWINGS

The present invention may be better understood, and its numerous objects, features and advantages made apparent to those skilled in the art by referencing the accompanying drawings.

FIG. 1C is a block diagram of a container file, according to one embodiment of the present invention.

FIG. 1D is a block diagram of an index file and a data file, according to one embodiment of the present invention.

FIG. 4C illustrates a backup identification list, according to one embodiment of the present invention.

Figure 1A:
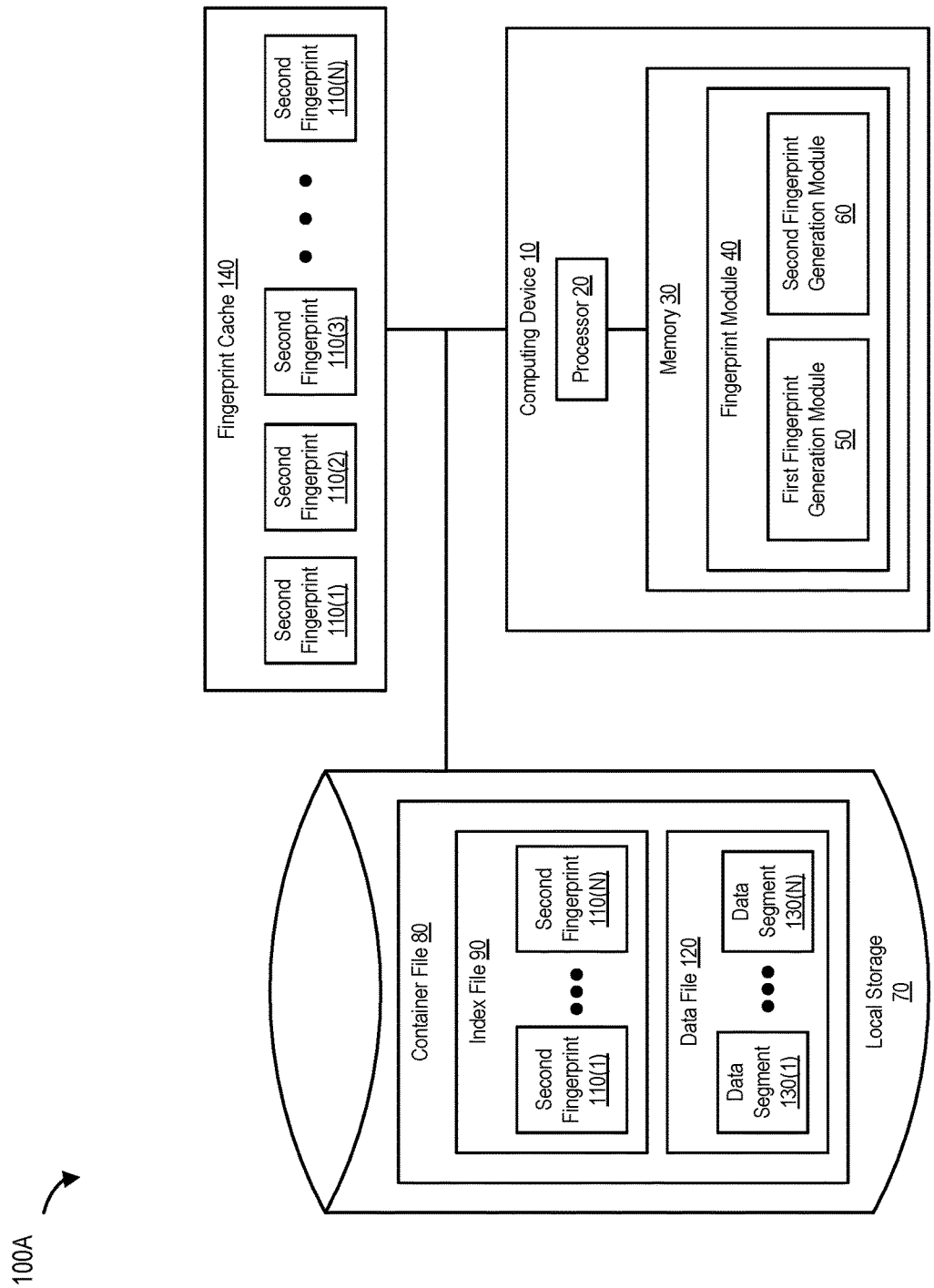
FIG. 1A is a block diagram of a system for caching fingerprints, according to one embodiment of the present invention.

While the invention is susceptible to various modifications and alternative forms, specific embodiments of the invention are provided as examples in the drawings and detailed description. It should be understood that the drawings and detailed description are not intended to limit the invention to the particular form disclosed. Instead, the intention is to cover all modifications, equivalents and alternatives falling within the spirit and scope of the invention as defined by the appended claims.

DETAILED DESCRIPTION

Introduction

A fingerprinting algorithm is an algorithm that maps a large data item (e.g., a computer file) to a shorter bit string. The shorter bit string is referred to as the "fingerprint" of the data item. The fingerprint uniquely identifies the data item, much like a human fingerprint identifies a human being for security-related purposes.

During a backup, clients and/or computing systems can duplicate data within a set of data to be backed up. In addition, if a set of data is backed up multiple times, the data that is unchanged also results in duplicates of previously backed up data. In order to prevent backing up duplicate data from a client or multiple clients, backup systems can implement deduplication, which is a process for removing duplicate copies of data. Deduplication preserves storage space when backing up data from client systems.

Fingerprints may be used for data deduplication purposes. Fingerprints can be used to avoid the comparison and transmission of bulky data. For example, a web browser or proxy server can check whether a remote file has been modified by retrieving only the remote file's fingerprint (instead of the entire remote file), and comparing the retrieved fingerprint with that of a previously-retrieved copy of the remote file.

A fingerprint is a value generated for a given data segment. Typically, such fingerprint values need to be substantially unique to each data segment, and thus distinguish data segments from one another. An example of a fingerprint is a hash value. For example, hashing algorithms (also called fingerprinting algorithms) such as Rabin's Algorithm, Message-Digest Algorithm 5(MD5), Secure Hash Algorithm 1 (SHA-1), and Secure Hash Algorithm 256 (SHA-256) and the like can be used to generate hash values.

The function of a hashing algorithm is to recreate input data from the hashing algorithm's hash value alone. The input data is typically referred to as the "message" and the hash value is typically referred to as the "message digest" or simply "digest." The ideal hashing algorithm when implemented for cryptographic purposes serves at least four functions: it is easy to compute the hash value for any given message, it is infeasible to generate a message that has a given hash value, it is infeasible to modify the message without changing the hash value, and it is infeasible to find two different messages with the same hash value.

However, even the most secure hashing algorithm may be deciphered, for example, by a hacker and/or intruder. For example, hashing algorithms such as MD5 and SHA take a long time to execute and also lack proven guarantees to prevent collision probability (the probability that two different messages have the same hash value). Therefore, some of these hashing algorithms, notably MD5, are no longer recommended for long-term fingerprinting purposes where data tampering is a concern.

To ameliorate the problems that arise from depending on a single hashing algorithm to secure sensitive data from attacks, companies typically change the hashing/fingerprinting algorithm from time to time to make it harder for a hacker and/or intruder to decipher and/or identify the hash values generated by the existing hashing algorithm. However, when a fingerprinting algorithm is changed, the fingerprints of existing data segments associated with the old fingerprinting algorithm have to be recalculated based on the new fingerprinting algorithm, before a system can be considered operational.

Recalculating fingerprints of data segments requires both the old fingerprint and the new fingerprint to co-exist on a computer system so that any existing data segments and newly-generated data segments can be converted to the new fingerprint. This conversion process not only takes a considerable amount of time and significant computing resources, but also negatively affects data operations such as backup, restore, and replication because such data operations have to be put on hold (or at least slowed down considerably) while an old fingerprint associated with a data segment is being converted to a new fingerprint. Therefore, it is useful to permit the old fingerprint to be referenced while the conversion process is ongoing, while at the same time maintaining the performance of data operation processes such as deduplication backup operations, restore operations, and data replication operations.

Caching Multiple Fingerprints

FIG. 1A is a block diagram of a computing system (also referred to as a client or a client system). This system includes a computing device 10, a local storage 70, and a fingerprint cache 140. As shown, computing device 10 is coupled to local storage 70 and fingerprint cache 140. Computing device 10 can be any of a variety of different types of computing devices, including a server, personal computing device, laptop computer, net book, personal digital assistant, cellular phone, or the like.

Computing device 10 includes a processor 20, and memory 30. Computing device 10 also includes a fingerprint module 40 which implements a first fingerprint generation module 50 and a second fingerprint generation module 60. Both first and second fingerprint generation modules can generate new fingerprints for a data segment by implementing, for example, a fingerprint generation routine that generates a new hash value. In this example, first fingerprint generation module 50 can implement a routine that uses a first fingerprinting algorithm or a first fingerprinting process to generate a first fingerprint (or a first hash value). Similarly, second fingerprint generation module 60 can implement a routine that uses a second fingerprinting algorithm or a second fingerprinting process to generate a second fingerprint (or a second hash value). It should be noted that the first fingerprint or first hash value is different than the second fingerprint or second hash value.

Local storage 70 stores a container file 80 which includes an index file 90 and a data file 120. In this example, index file 90 stores fingerprints (e.g., second fingerprints 110(1)-(N)) and data file 120 stores data segments (e.g., data segments 130(1)-(N)). Fingerprint cache 140 is a dedicated cache for storing fingerprints (e.g., second fingerprints 110(1)-(N)). It is noted that this is a simplified example, and that other embodiments can include far more complex organizational and configuration schemes than are shown here.

Computing device 10 is coupled to local storage 70. In this example, local storage 70 stores container file 80, but can also store data in other formats (not shown). Local storage 70 can be a persistent storage device and can include one or more of a variety of different storage devices, including hard disks, compact discs, digital versatile discs, solid state drive (SSD) memory such as flash memory, and the like, or one or more logical storage devices such as volumes implemented on one or more such physical storage devices.

Computing device 10 is also coupled to a fingerprint cache 140. In this example, fingerprint cache 140 can be a SSD such as Flash memory, or even a file, and implements a cache so that data (e.g., frequently accessed fingerprints) can be served to computing device 10 in an expeditious manner, versus, for example, from a slower storage device which may use a hard disk drive (HDD). However, fingerprint cache 140 can be implemented on one or more of a variety of different storage devices, including hard disks, compact discs, digital versatile discs, and the like, or on one or more logical storage devices such as volumes implemented on one or more such physical storage devices.

Computing device 10, local storage 70, and fingerprint cache 140 can be integrated (e.g., where the storage device is coupled to the node's internal processing devices by an internal bus and is built within the same chassis as the rest of the node) or separate. If separate, computing device 10, local storage 70, and fingerprint cache 140 can be coupled by a local connection (e.g., using a technology such as Bluetooth™, Peripheral Component Interconnect (PCI), Small Computer System Interface (SCSI), or the like) or via one or more networks such as the Internet or a storage area network (not shown in this example).

Figure 1B:
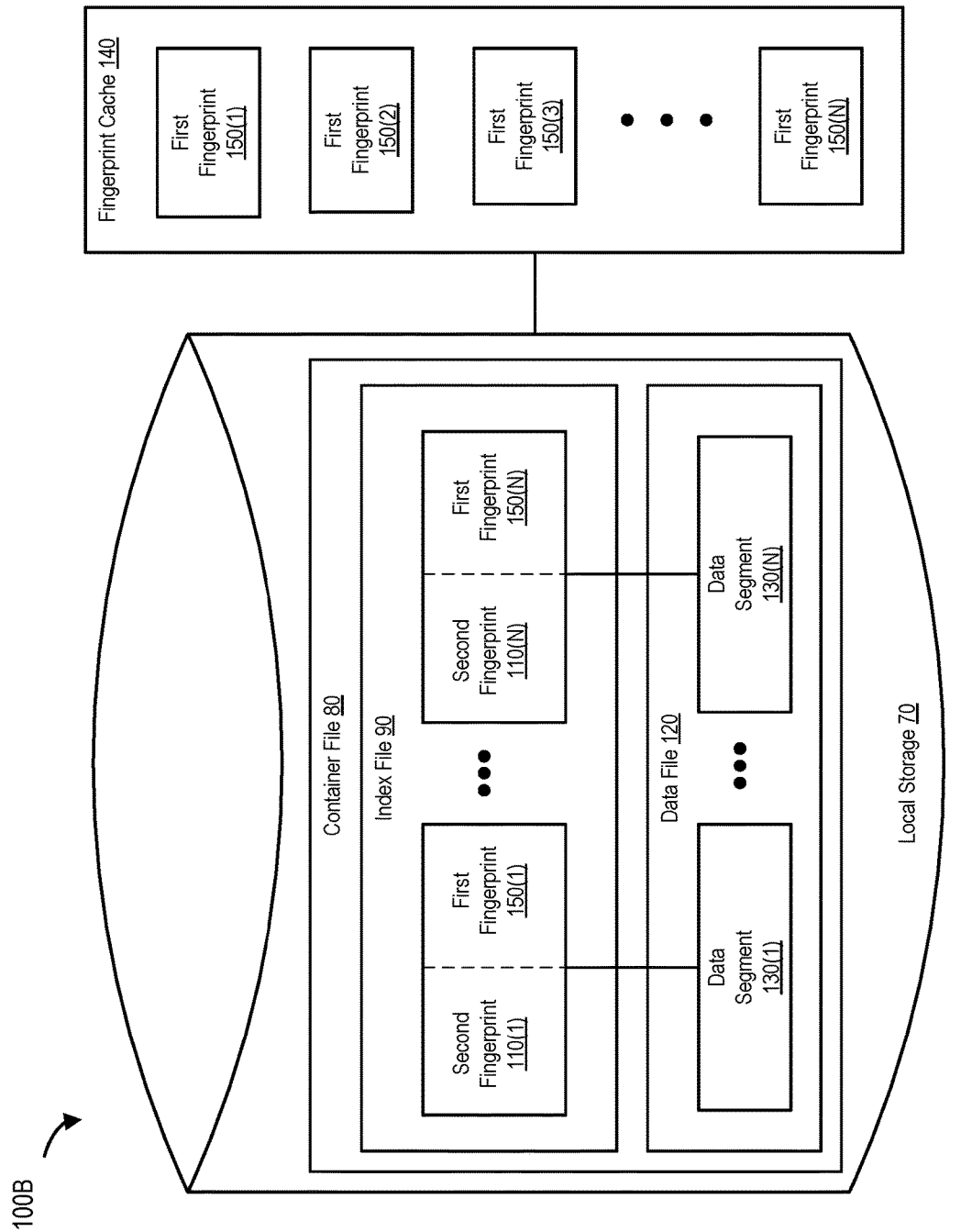
FIG. 1B is a block diagram of a system for caching multiple fingerprints in an index file, according to one embodiment of the present invention.

FIG. 1B is a block diagram of a computing system that stores multiple fingerprints in a container file. In a deduplication backup system, data segments (e.g., data segments 130(1)-(N)) are stored in a data file (e.g., data file 120) of a container file 80. Each container file includes an index file 90 and a data file 120. In this example, index file 90 also stores second fingerprint 110(1) and first fingerprint 150(1) together, and is associated with the pair of second and first fingerprints with a data segment (e.g., second fingerprint 110(1) is stored alone with first fingerprint 150(1) in index file 90, and both fingerprints are associated with the same data segment (e.g., data segment 130(1)) which is stored in data file 120).

Therefore, as shown in FIG. 1B, index file 90 records and stores fingerprint information and data file 120 stores data segments which correspond to the fingerprints which are stored in index file 90. Also as shown in FIG. 1B, fingerprint cache 140 stores first fingerprints 150(1)-(N). For example, after data segments associated with second fingerprints 110(1)-(N) (which were previously stored in fingerprint cache 140) (as shown in FIG. 1A) have been converted to first fingerprints 150(1)-(N), fingerprint cache 140 can be cleared of second fingerprints 110(1)-(N) and first fingerprints 150(1)-(N) can be stored in their place instead.

In one embodiment, a first fingerprint 150(1) is generated based on a first fingerprinting process (e.g., a process and/or routine generated by first fingerprint generation module 50 as shown in FIG. 1A). In this example, first fingerprint 150(1) is a new fingerprint because it replaces second fingerprint 110(1), which can be considered an old and/or existing fingerprint. Similarly, for example, the first fingerprinting is a new fingerprint and/or hash because it is being used as a replacement for the second fingerprint (as shown in FIG. 1A), which can be similarly considered an old and/or existing fingerprint and/or hash.

After first fingerprint 150(1) is generated based on a first fingerprinting process, first fingerprint 150(1) is stored along with second fingerprint 110(1) (which, in this example, is previously generated based on a second fingerprinting process) in index file 90. In addition, first fingerprint 150(1) and second fingerprint 110(1) are associated with the same data segment (e.g., data segment 130(1) as shown in FIG. 1B). After first fingerprint 150(1) is generated based on the first fingerprinting process and stored along with second fingerprint 110(1), and further after both first fingerprint 150(1) and second fingerprint 110(1) are associated with the same data segment, fingerprint cache 140 is cleared of second fingerprints 110(1)-(N) and replaced with first fingerprints 150(1)-(N).

In existing deduplication backup systems that implement fingerprints, an index file separately records fingerprint information, data segment location, and data segment size for each unique fingerprint associated with a data segment (e.g., <fp1, size1, offset1>, <fp2, size2, offset2>, etc.). Storing fingerprints in this manner can make it difficult to reference multiple fingerprints when performing data operations and can slow down such data operations.

Referencing Multiple Fingerprints

FIG. 1C illustrates the composition of container file 80, which, according to one or more embodiments, can be modified to permit a backup operation to reference multiple fingerprints. At the beginning of an initial backup operation, new data segments are written into new container files (e.g., container file 80). At the end of the initial backup operation, a data object is stored in the newly-created container file. The data object contains the following information: <fp1, size1, containerID1>, <fp2, size2, containerID2>, etc. A data object typically corresponds to a backup image that includes the data segments to be backed up during a full or incremental backup operation.

According to one embodiment, at the beginning of a new backup operation from the same client and/or backup policy that performed and/or requested the initial backup operation, data objects containing fingerprints of the last full backup operation (in this example, the initial backup operation) are retrieved from container file 80. Data segments in the new backup operation are fingerprinted (e.g., using first fingerprint generation module 50) and looked up within fingerprints (e.g., second fingerprints 110(1)-(N)) from the last full backup operation.

Fingerprints which incur a lookup miss (e.g., fingerprints are not present in the last full backup operation) are looked up in a central fingerprint index cache (e.g., fingerprint cache 140). If the fingerprints are not found in the central fingerprint index cache, they are inserted into the central fingerprint index cache. Future backup operations can now reference fingerprints from both the last full backup operation (e.g., the initial backup operation) and the new backup operation.

In some embodiments, the central fingerprint index cache can be maintained by a deduplication server. In this example, the central fingerprint index cache contains part of the entire set of fingerprints that exist in the deduplication system and can contain fingerprints generated by a first fingerprinting algorithm and fingerprints previously generated by a second fingerprinting algorithm. Although future backup operations can reference fingerprints from the previous backup operations, the central fingerprint index cache does not have the entire universe of first fingerprints 150 (1)-(N) and second fingerprints 110(1)-(N) because, in this example, fingerprint cache 140 is implemented on a SSD, which provides faster fingerprint retrieval and lookup functions, but not enough space to store the entire universe of fingerprints associated with the various data segments in the previous backups. Therefore, index file 90 needs to be modified so that future backup operations can reference index file 90 instead of having to store all the fingerprints in fingerprint cache 140.

Modifying an Index File to Store Multiple Fingerprints

FIG. 1D illustrates the modified composition of index file 90, according to one or more embodiments. In one embodiment, after a binary package upgrade, fingerprint cache 140 is cleared and data segments are read from one container file following another container file. Fingerprints in container file 80 are recalculated based on the changed fingerprinting/hashing algorithm (or process), and are inserted into fingerprint cache 140 (e.g., first fingerprints 150(1)-(N) are inserted into fingerprint cache 140 as shown in FIG. 1B), and are also stored in index file 90 along with second fingerprints 110(1)-(N) (e.g., the old fingerprints previously-generated using second fingerprint generation module 60).

In this example, second fingerprints 110(1)-(N), which were previously-calculated using the second fingerprinting process, are recalculated based on the first fingerprinting process. Upon recalculating second fingerprints 110(1)-(N) based on the first fingerprinting process, first fingerprints 150(1)-(N) (which are the recalculated fingerprints) are stored along with second fingerprints 110(1)-(N) in index file 90. Upon storing, and as shown in FIG. 1D, the modified index file contains: <second fingerprint 110(1) from second fingerprinting algorithm/process, first fingerprint 150(1) from first fingerprinting algorithm/process, size1, offset1>, <second fingerprint 110(2) from second fingerprinting algorithm/process, first fingerprint 150(2) from first fingerprinting algorithm/process, size2, offset2>, etc.

In some embodiments, a new backup operation can start while the conversion of second fingerprints 110(1)-(N) to first fingerprints 150(1)-(N) based on the first fingerprinting process is ongoing. Modifying index file 90 in the manner described above permits a new backup operation to continue with a desirable deduplication rate while the conversion of fingerprints is ongoing. In addition, restore and replication operations can also be performed while the conversion is ongoing and can be concluded before the conversion is completed.

Performing Deduplication Backup Operations Using Multiple Fingerprints

Figure 2:
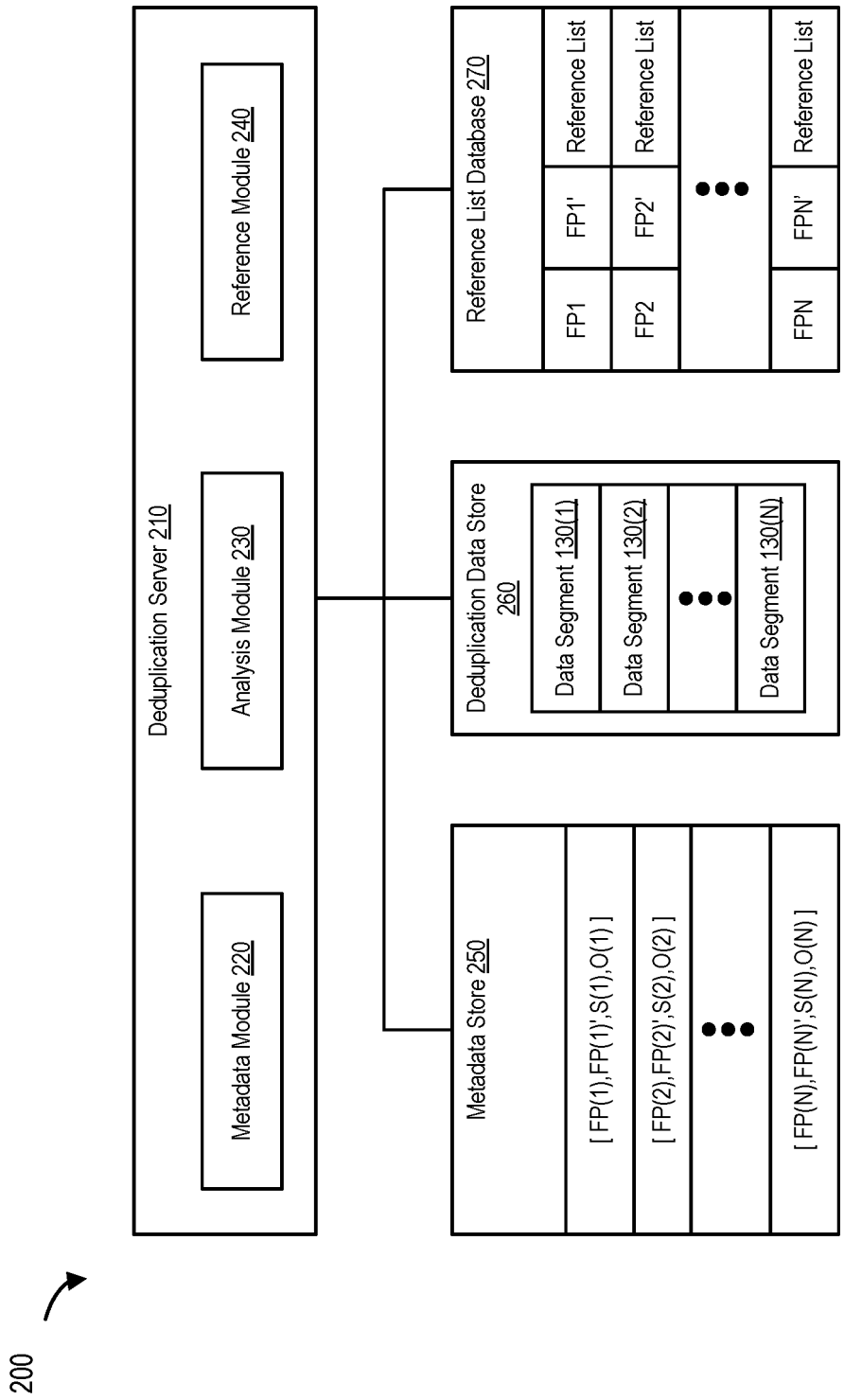
FIG. 2 is a block diagram of a deduplication server that performs deduplication system backups, according to one embodiment of the present invention.

FIG. 2 illustrates a deduplication server 210. In order to perform data deduplication, a deduplication system needs to be able to identify redundant copies of the same data. One way that can provide a reasonable likelihood of finding duplicated instances of data is to divide file data into consistently-sized data segments, which are analyzed for duplication in deduplicated data store 260 (e.g., by analysis module 230). Thus, if only a portion of a large file is modified, then only the data segment corresponding to that portion of the file need be stored in the deduplicated data store 260 and the remainder of the file segments will not be duplicated. In the embodiments described herein, a backup image file can be divided into a plurality of chunks, and each chunk can be divided into a plurality of fixed-size data segments.

In the embodiment shown, deduplicated data store 260 includes a set of data segments 130(1)-(N), also referred to herein as data segments 130, of deduplicated data. Data segments 130 can be received from one or more clients (e.g., computing device 10). Typically, each data segment 130 is unique (e.g., no two data segments stored within data segments 130 have the same value). Also, in the embodiment shown, metadata store 250 includes multiple entries, where each entry is associated with a data segment. Each entry includes a first fingerprint, a second fingerprint, a size of the data segment associated with the first and second fingerprints, and location/offset of the data segment associated with the first and second fingerprints.

Rather than comparing a data segment itself to each data segment stored in deduplication data store 260 (which can be enormously time and processing prohibitive), detection of duplicative data can be performed by comparing the fingerprint(s) of each data segment. For example, deduplication server 210 can use both first fingerprints 150(1)-(N) and second fingerprints 110(1)-(N) to determine whether a given segment is already stored in deduplicated data store 260 while the conversion of index file 90 is ongoing. However, after data segments in index file 90 that were previously calculated with the second fingerprinting process are recalculated and converted to a first fingerprint based on the first fingerprinting process, deduplication server 210 can use just the first fingerprint.

In many embodiments, fingerprints are generated in a manner (e.g., using a cryptographically strong, collision-resistant hash function) that produces the same identifier for identical items of data, while also producing different identifiers for non-identical items of data. In one example, fingerprint generation based on the first fingerprinting process can be performed by computing device 10. First fingerprints generated on computing device 10 can be transmitted to deduplication server 210, without also transmitting the data segments themselves to deduplication server 210. In an alternative example, computing device 10 can transmit the data segments themselves to deduplication server 210, and deduplication server 210 can use the same fingerprint-generation technique to generate fingerprints for the data segments. However, in such an alternative example, server-side fingerprint generation can consume a greater amount of network resources (e.g., bandwidth) and processing resources (e.g., a processor of deduplication server 210), as compared to client-side fingerprint generation.

By comparing a newly-generated fingerprint of a new data segment to the first fingerprints 150(1)-(N) and second fingerprints 110(1)-(N) of data segments 130 already stored by the deduplication system, deduplication server 210 can determine whether to add the new data segment to the deduplicated data store 260 (e.g., the new data segment is a unique data segment). In particular, if a new data segment's fingerprint does not match any existing fingerprints presently stored in metadata store 250, deduplication server 210 can determine that the new data segment is not already stored within data segments 130 in deduplicated data store 260. In response, deduplication server 210 can add the new data segment to the deduplicated data store 260, and add the new fingerprint(s) to the metadata store 250.

If the new segment has not been received at deduplication server 210, deduplication server 210 can request that computing device 10 transmit the particular data segments corresponding to the new fingerprints that are not present in the metadata store 250. Deduplication server 210 use the metadata received from computing device 10 (e.g., a list of fingerprints of the data segments) to identify the requested data segments to computing device 10 (e.g., identify each requested data segment by its corresponding fingerprint). Computing device 10 can transmit the requested data segments over a network via a data stream.

As the requested data segments are received, deduplication server 210 can write the data segments into container file 80. Once container file 80 is full, the entire container file can be written to a location in the deduplicated data store 260, which adds the data segments within the container file to the set of data segments 130 already stored in deduplicated data store 260 (e.g., adding a new data segment to deduplicated data store 260 as data segment 130(N+1)). Deduplication server 210 can generate metadata, such as a location that indicates the location of each data segment written to deduplicated data store 260. For example, each unique data segment can be associated with a location of the particular data segment, such as a container identification (container ID) that contains the unique data segment. Deduplication server 210 can create a new entry in metadata store 250 for a new data segment, and can store the data segment's location in the new entry. Deduplication server 210 can also add the new fingerprint of a data segment to the new entry associated with the corresponding data segment. Thus, in the embodiment shown, metadata store 250 can contain a new first signature 150(N+1) and a new location that correspond to a new data segment 130(N+1) that is stored in deduplicated data store 260.

If a new data segment's fingerprint matches existing fingerprints (e.g., first fingerprint 150(1) and second fingerprint 110(1)) presently stored in metadata store 250 and associated with the new data segment, deduplication server 210 can determine that the new data segment is likely to be already stored within data segments 130 (e.g., the new data segment is a common data segment), and thus does not need to be written to deduplication data store 260.

Figure 3A:
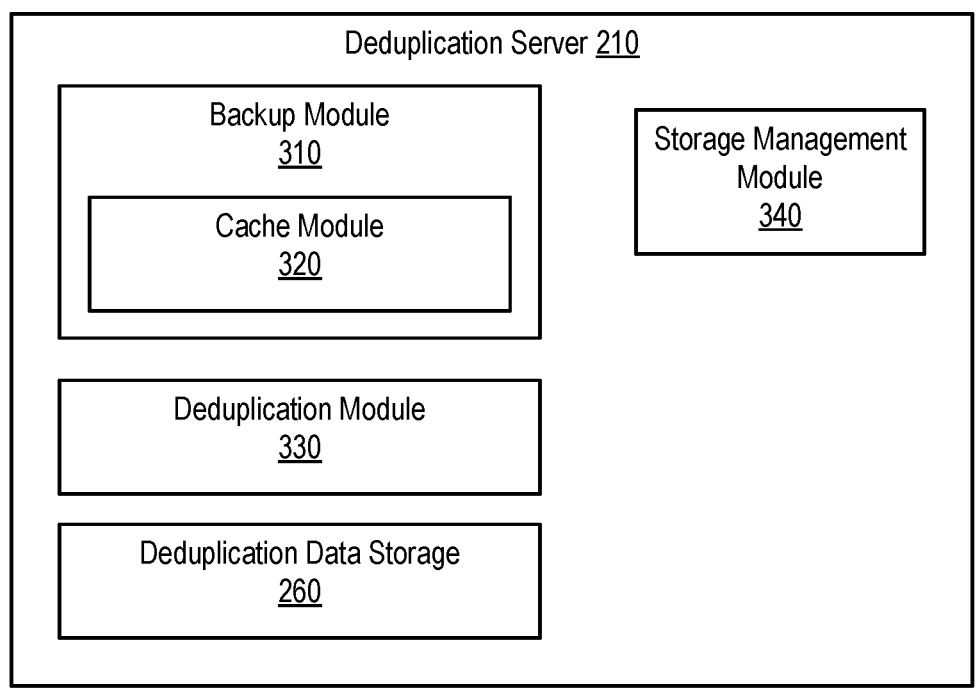
FIG. 3A is a block diagram of a deduplication server, according to one embodiment of the present invention.

FIG. 3A illustrates another embodiment of a deduplication server 210. Deduplication server 210 includes a backup module 310 (which includes a cache module 320), a deduplication module 330, a deduplication data storage 260, and a storage management module 350. Backup module 310, along with cache module 320, coordinate with other client systems to enable a backup of a client's system. For example, backup module 320 handles the receipt of queries from client systems and/or the transmission of responses or messages from the deduplication server to a client system. A response or message from the deduplication server to a client system can include a list of matching fingerprints, a message indicating that a data segment and/or data object exists within the deduplication server, and/or a message indicating that a particular data segment and/or data object will be protected from inadvertent deletion during the course of a backup process.

Cache module 320 references storage management module 350 to determine which data segments, data objects, and/or data segment fingerprints exist within deduplicating server 210. Storage management module 350 maintains information regarding data objects performed on each client system, data segments, and/or data segment fingerprints. Thus, storage management module 350 can add information received from a client (e.g. a data object, data segment, or data segment fingerprint) to update its information or can retrieve the necessary information to respond to a client query (e.g., from computing device 10).

Deduplication module 330 removes duplicate copies of data segments, if needed. Deduplication module 330 determines what duplicate copies exist, if any, and subsequently removes the duplicate copies to ensure that only a single copy of the data segment is stored within deduplication data storage 260. Deduplication data storage 260 stores backup copies of data segments once those data segments have been deduplicated by deduplication module 330.

Figure 3B:
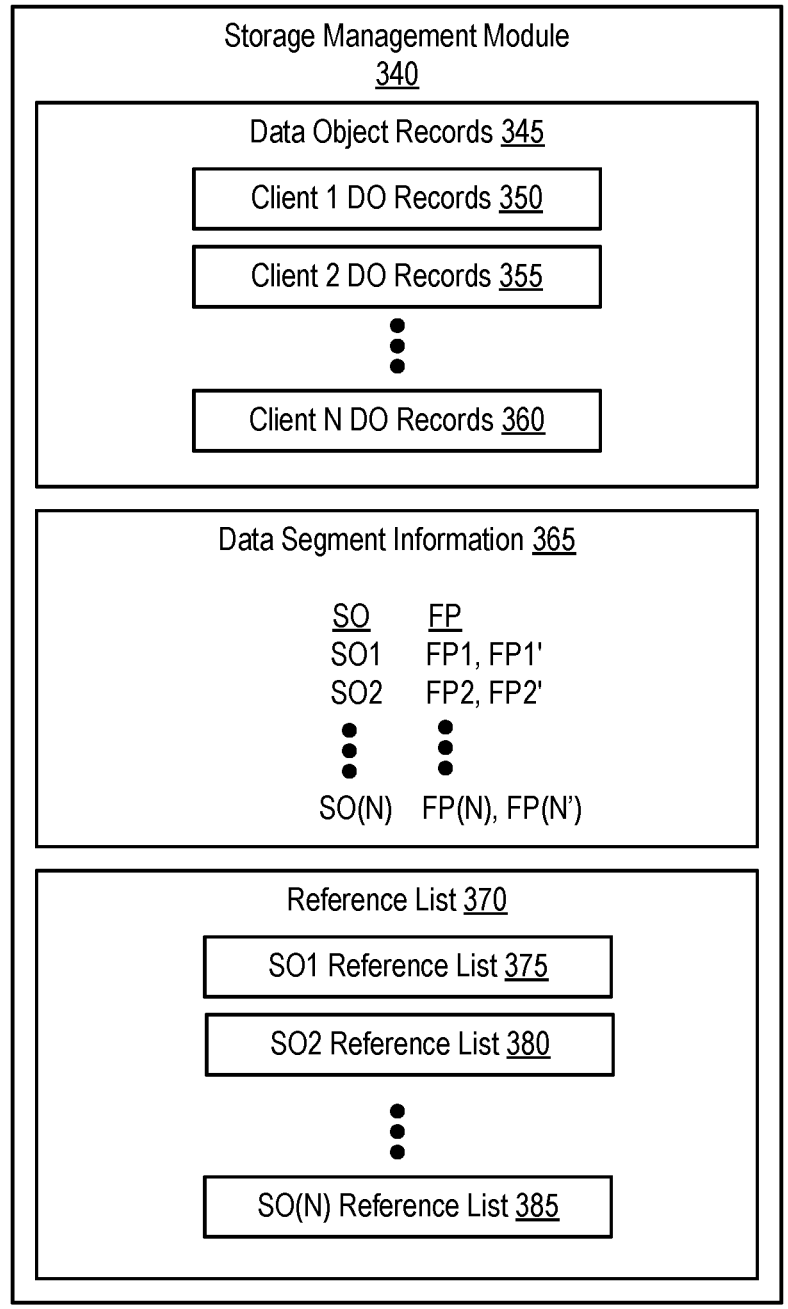
FIG. 3B is a block diagram of a storage management module, according to one embodiment of the present invention.

FIG. 3B illustrates an exemplary storage management module referenced by a deduplication server. Storage management module 340 includes data object records 345, data segment information 365, and a reference list 370 (which can be stored in a reference list database 270 as shown in FIG. 2). Data object records 345 include data object records for each client system requesting and/or performing a deduplication backup operation. As shown, storage management module 340 includes data object records for Client 1, 2, . . . , N, illustrated as Client 1 DO records 350, Client 2 DO records 355, . . . , Client N DO records 360. Data object records reflect the data object records for each individual client system. Thus, storage management module 340 includes data object records of all full and incremental backups performed on each respective client system.

Data segment information 365 includes fingerprint information for each individual data segment. As shown, data segment information 365 includes a list of data segments 1, 2, . . . , N as SO1, SO2, . . . , SO(N) and the corresponding fingerprint values for each data segment from first fingerprints 150(1)-(N) and second fingerprints 110(1)-(N) (shown as FP1 and FP1', FP2 and FP2', etc.). A reference list 370 includes individual reference lists for each data segment. As shown, reference list 370 (also as shown in FIG. 2) includes a reference list for data segments 1, 2, . . . , N as SO1 reference list 375, SO2 reference list 380, . . . , SO(N) reference list 385. Reference lists within storage management module 340 can be used to track data segments that are referenced by data objects.

A set of reference lists (e.g., one or more reference lists) can also be maintained at deduplication server 210 (or as shown in FIG. 2, at a reference list database 270 coupled to deduplication server 210). A reference list is a running set of the references made to a respective data segment, where a reference list includes one or more reference objects. Each reference object stores information about a file (e.g., a backup image) that includes (or makes reference to) the respective data segment, such as an identifier of the file (e.g., a backup image identifier, or backup ID). When a data segment is added to deduplicated data store 260, deduplication server 210 can be configured to add a fingerprint entry with more than one fingerprint (e.g., entries 415) that corresponds to the data segment. Deduplication server 210 can also be configured to add a reference object to a reference list that corresponds to the data segment, such as information about the file that includes the corresponding segment (e.g., a backup identifier of a backup image that includes the corresponding data segment).

If another copy of the data segment that is already stored in deduplicated data store 260 is encountered during a deduplication backup process (e.g., a fingerprint of a data segment matches a fingerprint stored in server cache or client cache), the copy is not stored again. In response to a copy being encountered, deduplication server 210 can be configured to add a new reference list to the set of reference lists that corresponds to the data segment, where a new reference object is added to the new reference list and indicates that another file also includes (or makes reference to) the data segment, such as a backup ID of another backup image that includes the data segment.

When a backup image expires, the reference object or backup ID of the expired backup image is removed from the data segment's reference list. When a data segment's reference list is empty (e.g., no files reference the segment), the data segment's entry is removed from the set of reference lists and the data segment is removed from deduplicated data store 260. Thus, a container file (stored in deduplicated data store 260 or local storage 70) can include active data segments that have a corresponding fingerprint entry and expired data segments that do not have a corresponding fingerprint entry, as well as empty space where expired data segments have been removed or deleted.

Figure 4A:
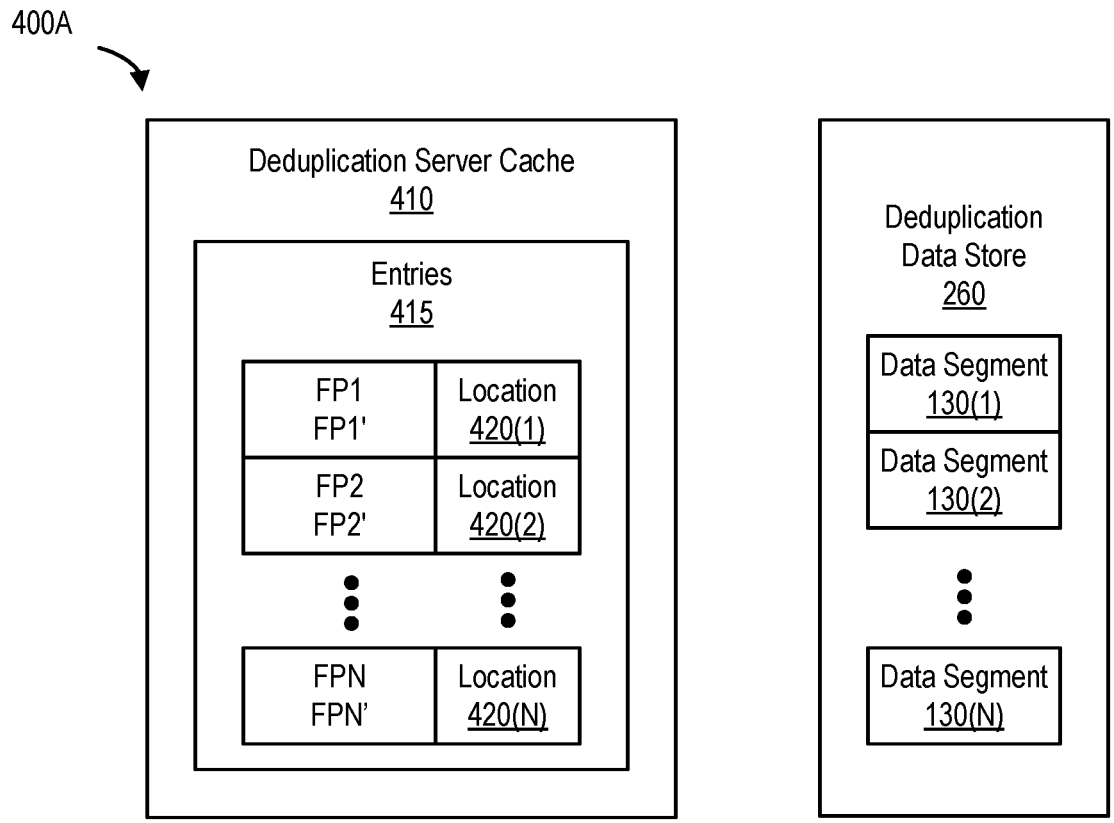
FIG. 4A is a block diagram of a deduplication server cache, according to one embodiment of the present invention.

FIG. 4A is a simplified block diagram illustrating components of an example deduplication server cache. Deduplication server cache 410, like fingerprint cache 140, can configured to store a set of fingerprints each of which is associated with a data segment stored in deduplicated data store 260. In the embodiment shown, each fingerprint entry includes a first fingerprint calculated using a first fingerprinting algorithm, a second fingerprint previously-calculated using a second fingerprinting algorithm, and locations 420(1)-(N). As shown in FIG. 4A, both the old and new fingerprints of a data segment and a location (or container ID) of the data segment are stored in the data segment's corresponding fingerprint entry. Deduplicated data store 260 is also illustrated, and stores data segments 130(1)-(N).

As noted above, fingerprints FP1 and FP1' are identifiers of a respective data segment stored in deduplicated data store 260. Location 420 is an identifier of a location of where a respective data segment is stored in deduplicated data store 260, such as an identifier of a storage container (e.g., container ID) that includes the respective data segment. For example, location 420(1) indicates the location of data segment 130(1), location 420(2) indicates the location of data segment 130(2), and so on. Each set of one and new fingerprints a data segment are associated with a location 420 of the data segment in the data segment's entry.

In some embodiments, data segments are grouped in fixed-size storage containers in the order that the data segments are received at deduplication server 210, where each container file is written to a location in deduplicated data store 260. Each data segment stored in a container file (e.g., in data file 120) is associated with a container identifier (ID) of the container file. The container ID of the data segment is stored in the data segment's corresponding fingerprint entry. Thus, multiple fingerprint entries can be associated with a same container ID, and multiple fingerprints for a single entry (e.g., FP1 and FP1' as shown in FIG. 4A) can also be associated with one container ID.

Figure 4B:
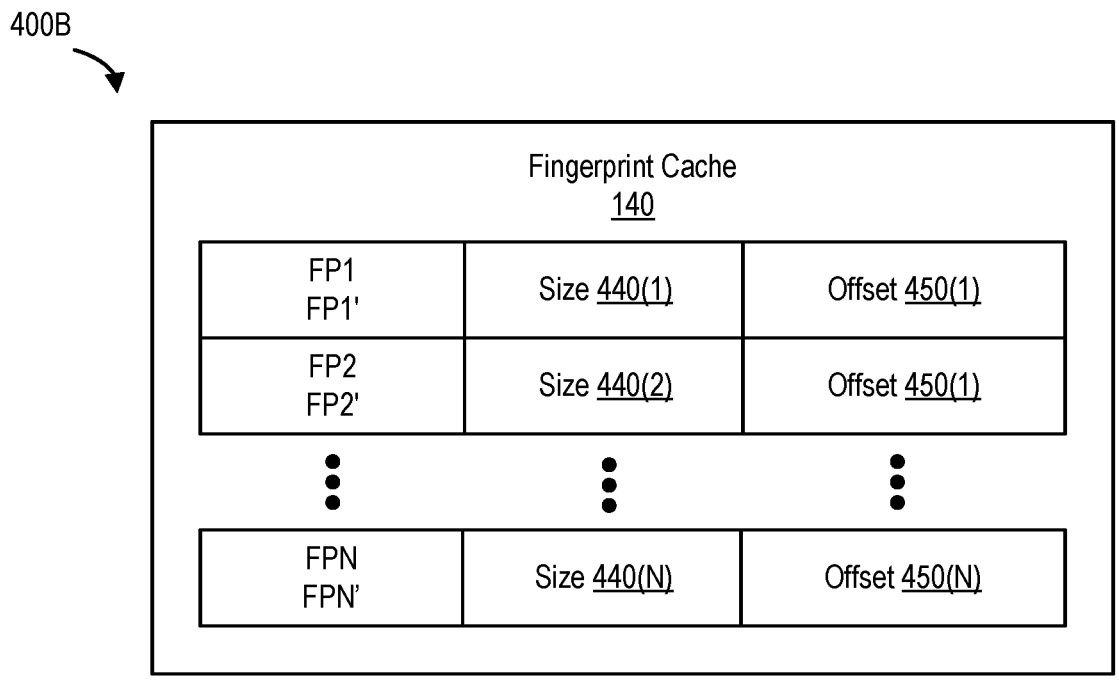
FIG. 4B is a block diagram of a fingerprint cache, according one embodiment of the present invention.

FIG. 4B is a simplified block diagram illustrating components of an example fingerprint cache. Fingerprint cache 140 is configured to store a subset of fingerprint entries retrieved from index file 90, which is stored in deduplication server cache 410 or local storage 70. In the embodiment shown, each fingerprint entry includes both first (new) and second (old) fingerprints (shown as FP1, FP1' and FP2, FP2' etc.), locations of the old and new fingerprints (shown as offsets 450(1)-(N)), and a segment size of the data segments (shown as sizes 440(1)-(N)). The subset of fingerprint entries are relevant to the computing device performing a deduplication backup operation, where each of the subset of fingerprint entries correspond to data segments included in one or more recent backup images. Thus, storing relevant and frequently accessed fingerprint entries in fingerprint cache 140 improves the likelihood of fingerprint cache hits, since the data segments corresponding to the relevant fingerprint entries are likely candidates to be reused as part of a new backup operation for data segments that have not changed since a previous (or initial) backup operation.

In one embodiment, the entire subset of fingerprint entries (e.g., an entry with just first fingerprints after index file 90 has been modified) is stored in fingerprint cache 140 (as shown in FIG. 1B). In another embodiment, the subset of fingerprint entries are stored in a buffer list or other temporary file, and a portion of the subset of fingerprint entries is selected from the buffer list and cached in fingerprint cache 140. By selectively caching a portion of the subset of fingerprint entries in the fingerprint cache, the likelihood of fingerprint cache hits is maintained while also improving fingerprint cache performance (e.g., reduce the time required to complete a fingerprint cache query or lookup by reducing the total number of cache entries to search). In one embodiment, the portion of the subset of fingerprint entries is selected based on container files with good spatial locality.

FIG. 4C is a simplified block diagram illustrating components of an example backup identifier (ID) list. Backup ID list 460 includes several entries, where each list entry corresponds to a backup image stored in deduplicated data store 260. Backup ID list 460 stores various metadata about the backup image files stored in deduplicated data store 260 (e.g., file name, file path, file attributes, fingerprints, etc.). In the embodiment shown, each list entry includes a backup identifier (ID) 465 of a corresponding backup image stored in deduplicated data store 260. Backup ID 465 is the combination of a client name 475 (e.g., a name of a client or computing device (e.g., computing device 10) performing and/or requesting a backup process to create a present backup image), a policy name 480 (e.g., a name of a backup policy created for the client), and a timestamp 485 of the corresponding backup image (e.g., a time when the backup image is created for the client).

Each list entry also includes type 490 (e.g., a backup image type, such as a full or incremental) and status 495 (e.g., a status of the corresponding backup image, such as active or inactive). Each list entry also includes contents 470, which includes information that identifies the data segments included in the corresponding backup image. In the example embodiment shown, the first entry includes information about a full backup image with active status that includes segments identified by segment objects SO1, SO2, and SO3. The second entry includes information about an incremental backup image with active status that includes segment objects SO1, SO2, and SO4. The segment objects in contents 470 can each include either first fingerprint 150, or a combination of first fingerprint 150 and second fingerprint 110 that identify a data segment included in the corresponding backup image, as well as size 440 of the data segment, and a offset 450 of the data segment (such as container ID of a container file (e.g., container file 80) that includes the data segment).

Referencing Fingerprints in a Backup or in a Cache

Figure 5A:
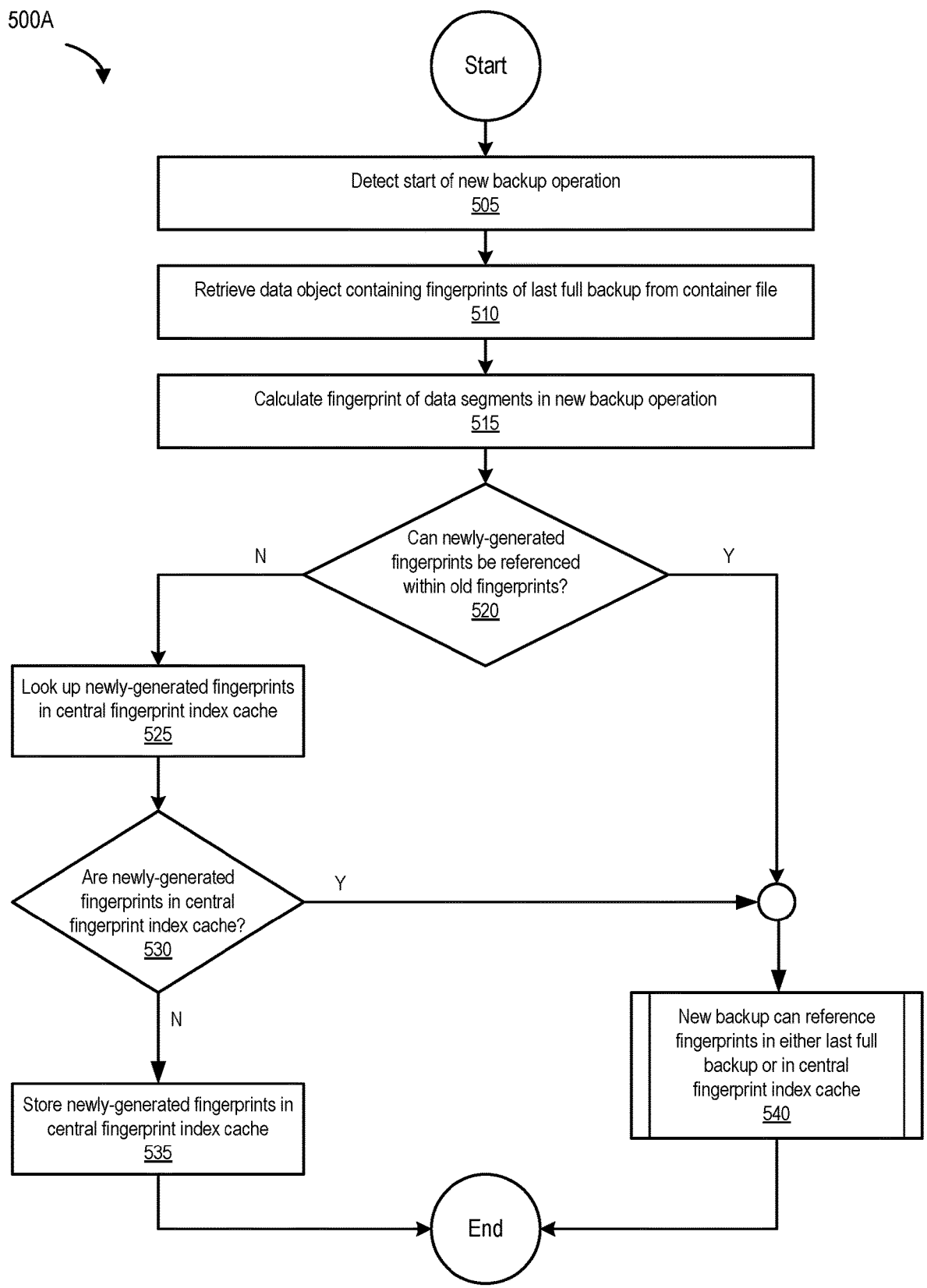
FIG. 5A is a flowchart that illustrates a method of referencing multiple fingerprints, according to one embodiment of the present invention.

FIG. 5A is a flowchart that illustrates a process for referencing multiple fingerprints in a previous backup or in a fingerprint cache (referred to in FIG. 5A as central fingerprint index cache). The process begins at 505 by detecting the start of a new backup operation. At 510, the process retrieves data objects containing fingerprints of a last full backup (e.g., second fingerprints 110(1)-(N) as illustrated in FIG. 1A) from a container file (e.g., container file 80). At 515, the process calculates fingerprints of data segments in the new backup operation. At 520, the process determines if the newly-generated fingerprints can be referenced (e.g., queried and/or looked up) within the data objects containing fingerprints of the last full backup. If the newly-generated fingerprints cannot be referenced and/or looked up within the old fingerprints (e.g., second fingerprints 110(1)-(N) calculated and/or generated using a second fingerprinting process as shown in FIG. 1A), the process, at 525, looks up the newly-generated fingerprints in the central fingerprint index cache (e.g., fingerprint cache 140 as shown in FIG. 1A).

At 530, the process determines if the newly-generated fingerprints can be found in the central fingerprint index cache. If the newly-generated fingerprints cannot be found in the central fingerprint index cache, the process, at 535, stores the newly-generated fingerprints in the central fingerprint index cache. However, if the newly-generated fingerprints can be referenced within the old set of fingerprints from the last full backup, or if the newly-generated fingerprints can be found in the central fingerprint index cache, the process ends at 540, by permitting the new backup operation to reference the fingerprints in either the last full backup or in the central fingerprint index cache. In this example, the newly-generated fingerprints are new fingerprints created because of new data segments (e.g., the newly-generated fingerprints may be calculated using the second fingerprinting process and may be necessitated by a new data segment that is discovered during the new backup operation that is not present in the last full backup).

Storing Multiple Fingerprints in an Index File

Figure 5B:
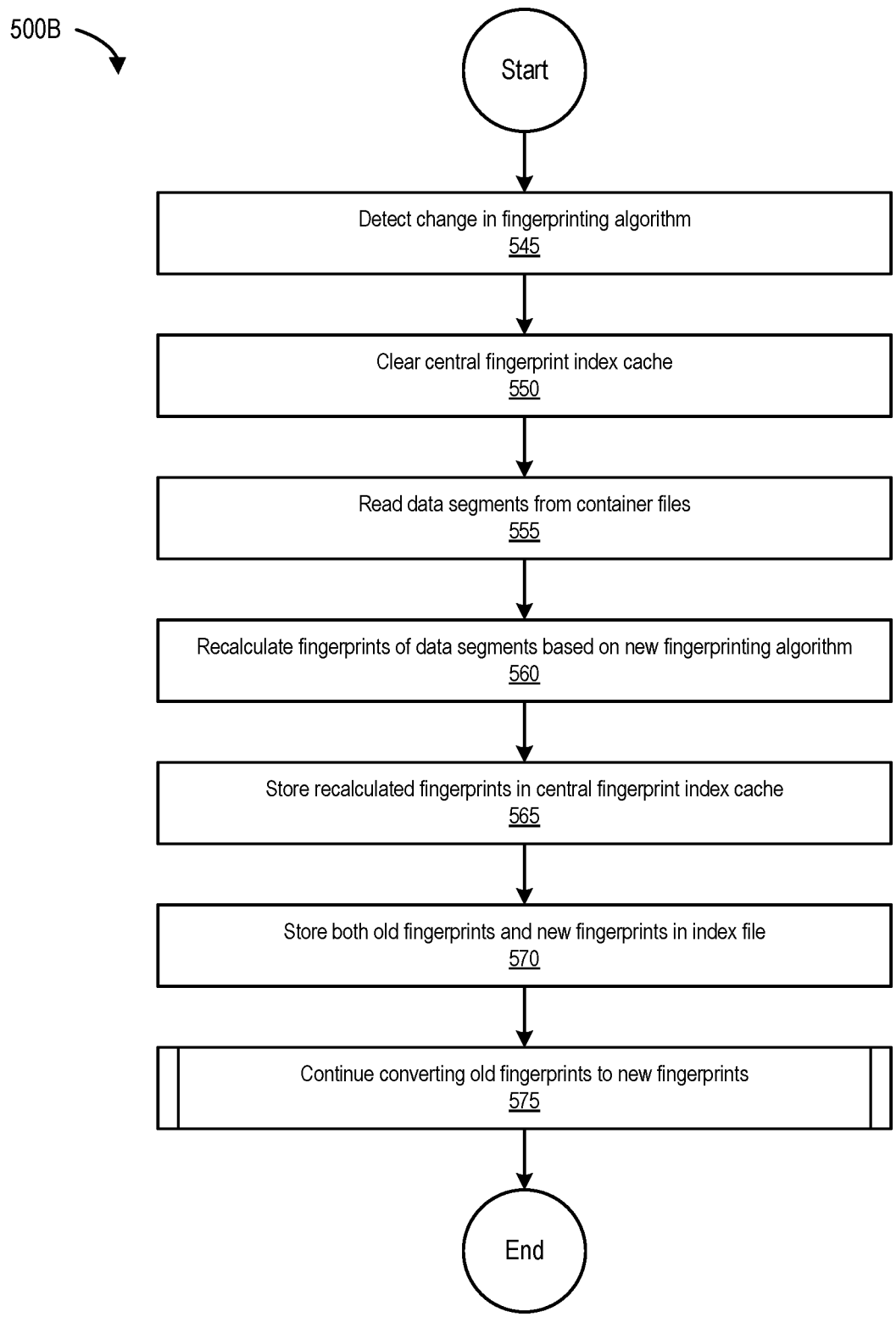
FIG. 5B is a flowchart that illustrates a method of converting old fingerprints to new fingerprints, according to one embodiment of the present invention.

FIG. 5B is a flowchart that illustrates a process for storing multiple fingerprints in an index file (e.g., index file 90). The process begins at 545 by detecting a change in the fingerprinting algorithm. A change in the fingerprinting algorithm can be requested by a client system (e.g., computing device 10), a user of the client system, or can be automatically requested based on a threshold, or some other criteria.

For example, if a company's intrusion detection system detects that an existing hashing algorithm has been compromised, the replacement of the existing hashing algorithm (e.g., second fingerprinting algorithm) with a different hashing algorithm (e.g., first fingerprinting algorithm) can be performed automatically. In an alternative example, a different hashing algorithm can be programmed to replace an existing hashing algorithm at predetermined time intervals (e.g., every few hours, days, weeks, months, etc.).

The process, at 550, clears the central fingerprint index cache after it detects a change (or a request to change) the fingerprinting algorithm. At 555, the process reads data segments from container file 80, and at 560, recalculates the fingerprints of data segments based on the new fingerprinting algorithm (e.g., recalculates second fingerprint 110(1) associated with data segment 130(1) based on a new fingerprinting algorithm to create first fingerprint 150(1) associated with the same data segment 130(1)). The process ends at 565 by storing the recalculated fingerprints in the central fingerprint index cache (e.g., fingerprints 150(1)-(N) associated with data segments 130(1)-(N) in fingerprint cache 140 as shown in FIG. 1B).

In some embodiments, the process modifies index file 90 to include both first and second fingerprints associated with the same data segment. As illustrated in FIG. 5B, the process, at 570, stores both old (second) and new (first) fingerprints in the index file (along with the size and offset of the data segment associated with the second and first fingerprints). In this example, the new backup operation of FIG. 5A is ongoing. However, the process does not wait for the new backup operation to stop or even slow down, and because index file 90 includes both the old (second) and new (first) fingerprints, the new backup operation also does not suffer a reduction in its deduplication rate. Therefore, the process ends at 575, by continuing to convert the old (second) fingerprints to new (first) fingerprints while the new backup operation is ongoing. In an alternative example, the process can start another deduplication backup operation with a desirable deduplication rate while the conversion of the fingerprints is ongoing. Therefore, slowly, over time, all second fingerprints associated with data segments stored in data file 120 are eventually converted to first fingerprints in index file 90, while the deduplication rate of backup operations remains unaffected.

Storing Newly-Generated Fingerprints in a Cache

Figure 6A:
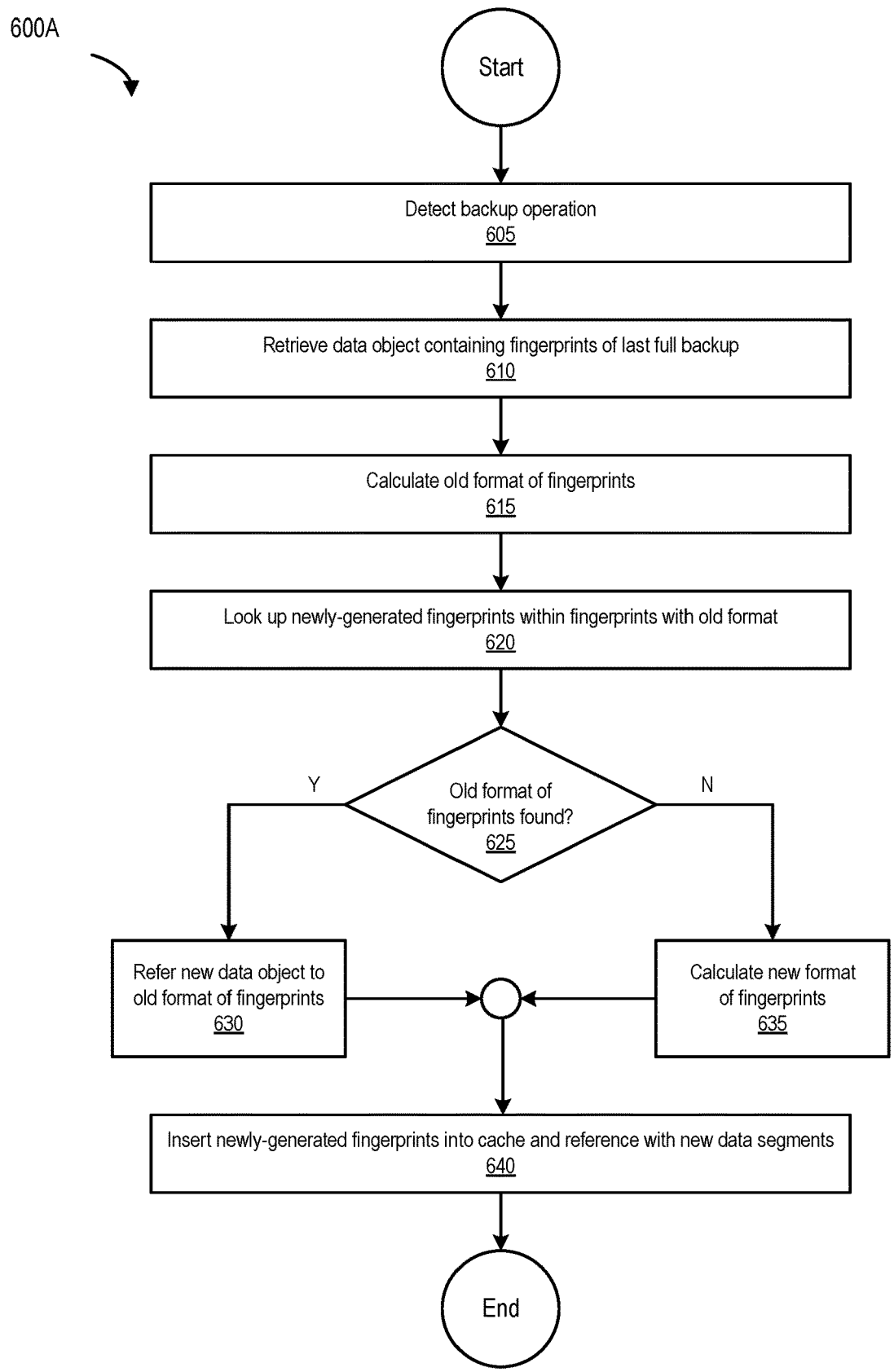
FIG. 6A is a flowchart that illustrates a method of inserting data segments into a cache and referencing the data segments with an index file, according to one embodiment of the present invention.

FIG. 6A is a flowchart that illustrates a process for storing newly-generated fingerprints in a cache. The process begins at 605 by detecting a backup operation. At 610, the process retrieves data objects containing fingerprints of a last full backup. At 615, the process (e.g., using a client) calculates the old format of the fingerprints (e.g., using a second fingerprinting process). At 620, the process looks up newly-generated fingerprints within fingerprints with the old format (calculated at 615). At 625, the process determines if the old format of fingerprints is found. If found, at 630, the process refers new data objects to the old format of fingerprints (e.g., the new data object will refer to the old format of the fingerprint). If not found, at 635, the process calculates a new format of the fingerprints (e.g., using the first fingerprinting process). Whether the new format of the fingerprint is found or not found within the old format of fingerprints, the backup operation refers to (and uses) the new format of the fingerprints.

Over time, the data object gains access to a higher percentage of fingerprints in the new format. If this is the case, the process at 615 (e.g., using a client) may first try the new format of the fingerprints, and if the new format of the fingerprints is not found, then the process may try the old format of the fingerprints. However, as illustrated in the flowchart of FIG. 6A, a client system may need to try both the new format of the fingerprints (e.g., fingerprints calculated using the first fingerprinting process) and the old format of the fingerprints (e.g., fingerprints calculated using the second fingerprinting process).

In another embodiment, a backup operation can be detected. The client can retrieve data objects containing fingerprints of a last full backup (e.g., an initial backup operation to backup data). Fingerprints of data segments in the ongoing backup operations can then be calculated (e.g., using an existing hashing algorithm). Newly-generated fingerprints can then be looked up within the retrieved fingerprints. Subsequently, a determination can be made whether the newly-generated fingerprints can be found in the retrieved fingerprints.

If the newly-generated fingerprints can be found in the retrieved fingerprints, the ongoing backup operation can reference newly-generated fingerprints with the retrieved fingerprints. If the newly-generated fingerprints cannot be found in the retrieved fingerprints, the newly-generated fingerprints can be looked up in the cache (e.g., fingerprint cache 140). The newly-generated fingerprints can be inserted into the fingerprint cache and the newly-generated fingerprints can be referenced with new data segments identified in the ongoing backup operation.

Converting an Index File During Hashing Algorithm Change

Figure 6B:
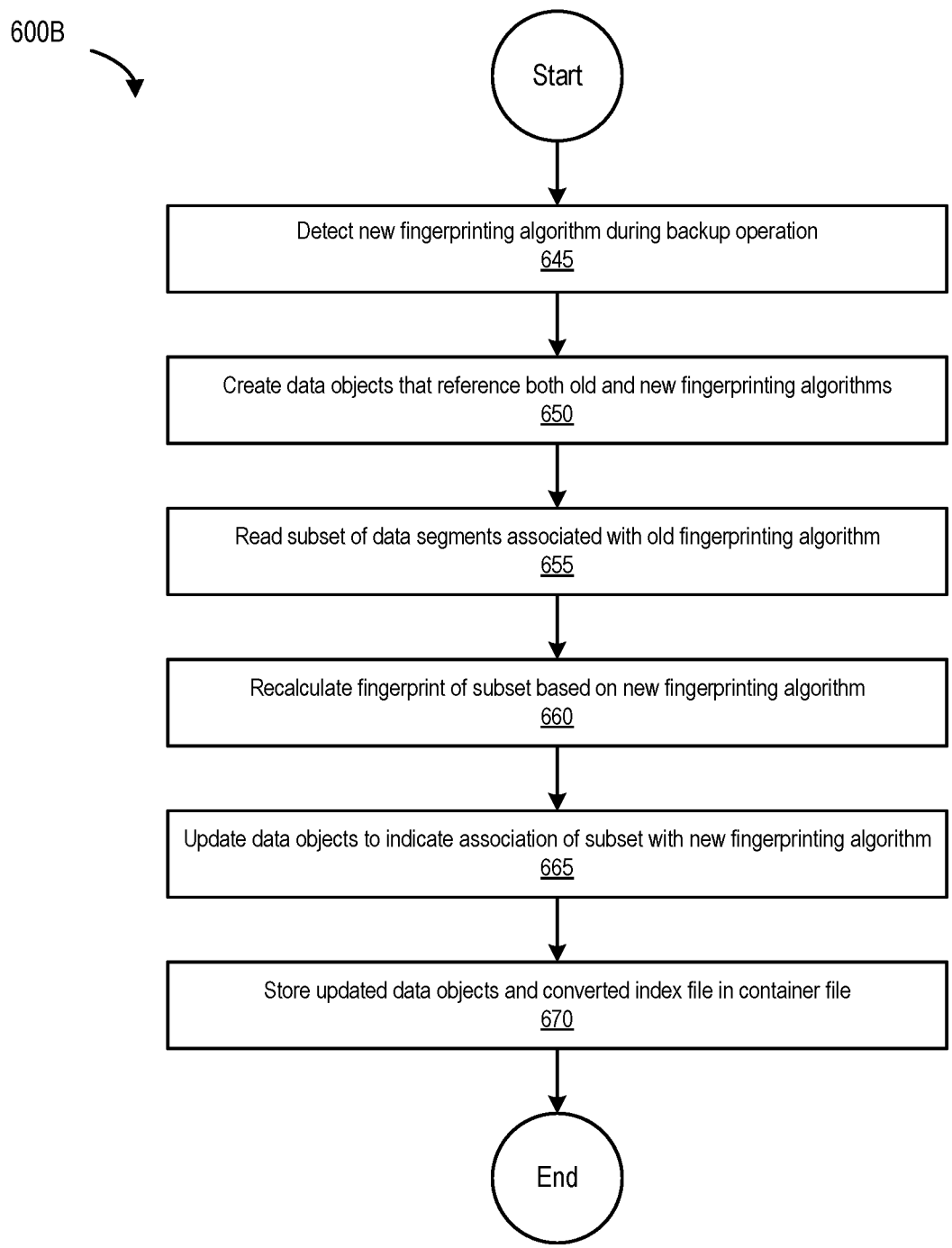
FIG. 6B is a flowchart that illustrates a method of storing updated data objects and a converted index file in a container file, according to one embodiment of the present invention.

FIG. 6B is a flowchart that illustrates a process for converting an index file after a change in a hashing algorithm. The process begins at 645 by detecting a new fingerprinting algorithm during a backup operation. At 650, the process creates data objects that reference both old and new fingerprinting algorithms. At 655, the process reads a subset of data segments (e.g., data segments 130(1)-(3)) associated with the second fingerprinting algorithm. The process, at 660, recalculates the fingerprints of the subset of data segments based on the first fingerprinting algorithm. In one example, the subset of data segments can be selected based on a most recently used (MRU) caching algorithm. In an alternate example, the subset of data segments can be selected by a user of a client system to indicate certain data segments are more important and/or more pertinent to a search query.

At 665, after recalculating the fingerprints of the subset of data segments based on the first fingerprinting algorithm, the process updates the data objects to indicate an association between the subset of data segments and the new fingerprinting algorithm. In some embodiments, the process can convert index file 90 based on the first fingerprinting algorithm or process during the backup operation (or while the backup operation is ongoing). An example composition of index file 90 after the conversion is shown in FIG. 1D. The process ends at 670 by storing the updated data objects and the converted index file in container file 80.

Performing a Restore Operation During Hashing Algorithm Change

Figure 7A:
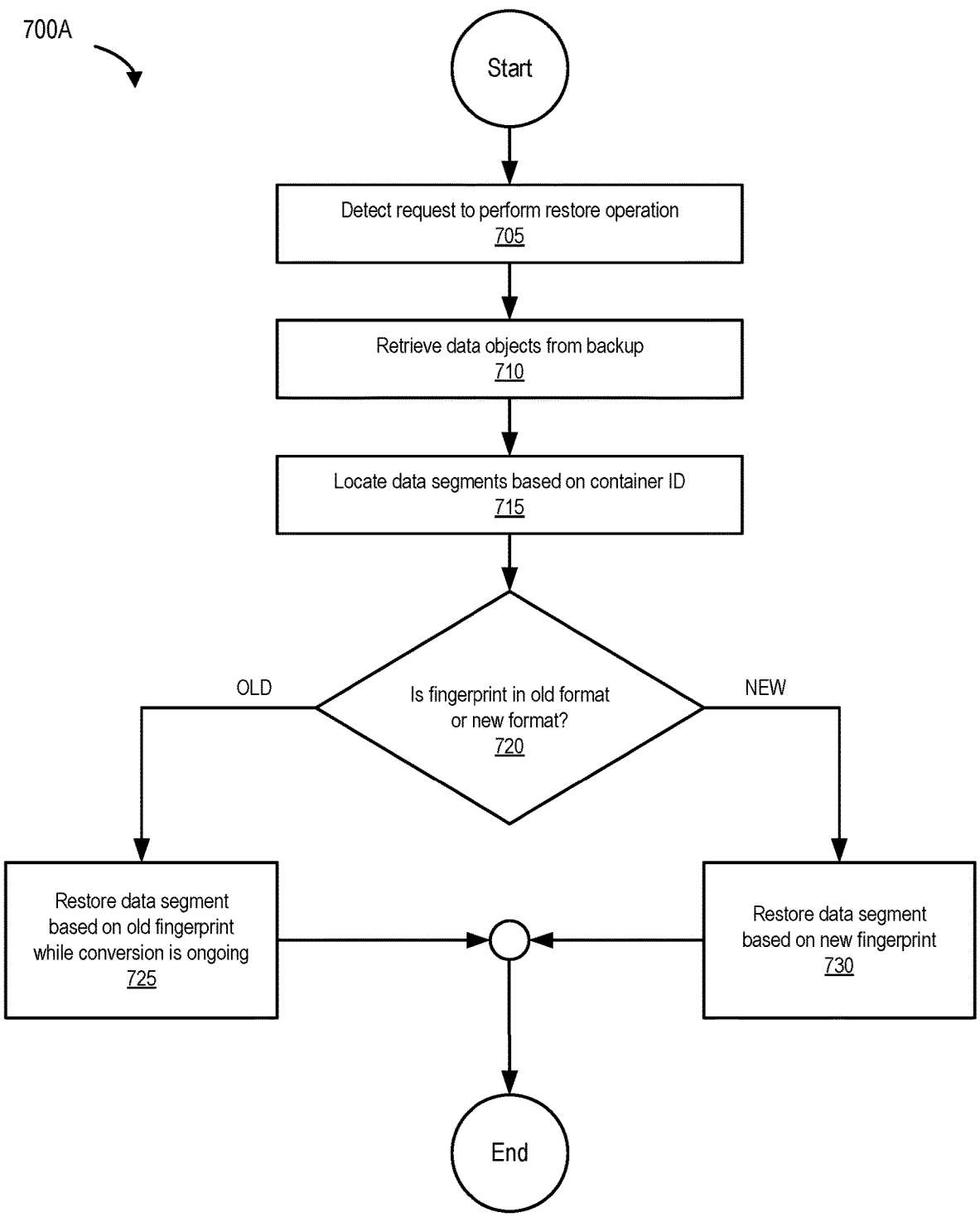
FIG. 7A is a flowchart that illustrates a method of performing a restore operation based on multiple fingerprints, according to one embodiment of the present invention.

FIG. 7A is a flowchart that illustrates a process for performing a restore operation during a change in a hashing algorithm. The process begins at 705 by detecting a request to perform a restore operation (e.g., from computing device 10 and/or client system). At 710, the process retrieves data objects from a previous backup (e.g., an initial backup or a last full backup). At 715, the process locates data segments based on the container ID of the data segments (as shown in FIG. 4C).

At 720, the process determines if the fingerprint is in the old format or in the new format (e.g., whether data segment 130(1)) has an old fingerprint (e.g., second fingerprint 110(1)) or a new fingerprint (e.g., first fingerprint 150(1)). In this example, the new fingerprint is calculated using the first fingerprinting process. If the container ID has the old fingerprint, the process, at 725, restores the data segment based on the old fingerprint while the conversion of the old fingerprint to the new fingerprint is ongoing. If the container ID has just the new fingerprint, the process ends at 730 by performing the restore operation based on just the new fingerprint. It should be noted that in some embodiments, a data object can have both a new fingerprint format (e.g., first fingerprint 150) and an old fingerprint format (e.g., second fingerprint 110). However, in this example, the data object only uses a new fingerprint format or an old fingerprint format of a data segment—not both old and new fingerprints at the same time. In this manner, the restore operation is successfully before the generation (or conversion) of fingerprints is completed.

Data Replication During Hashing Algorithm Change

Figure 7B:
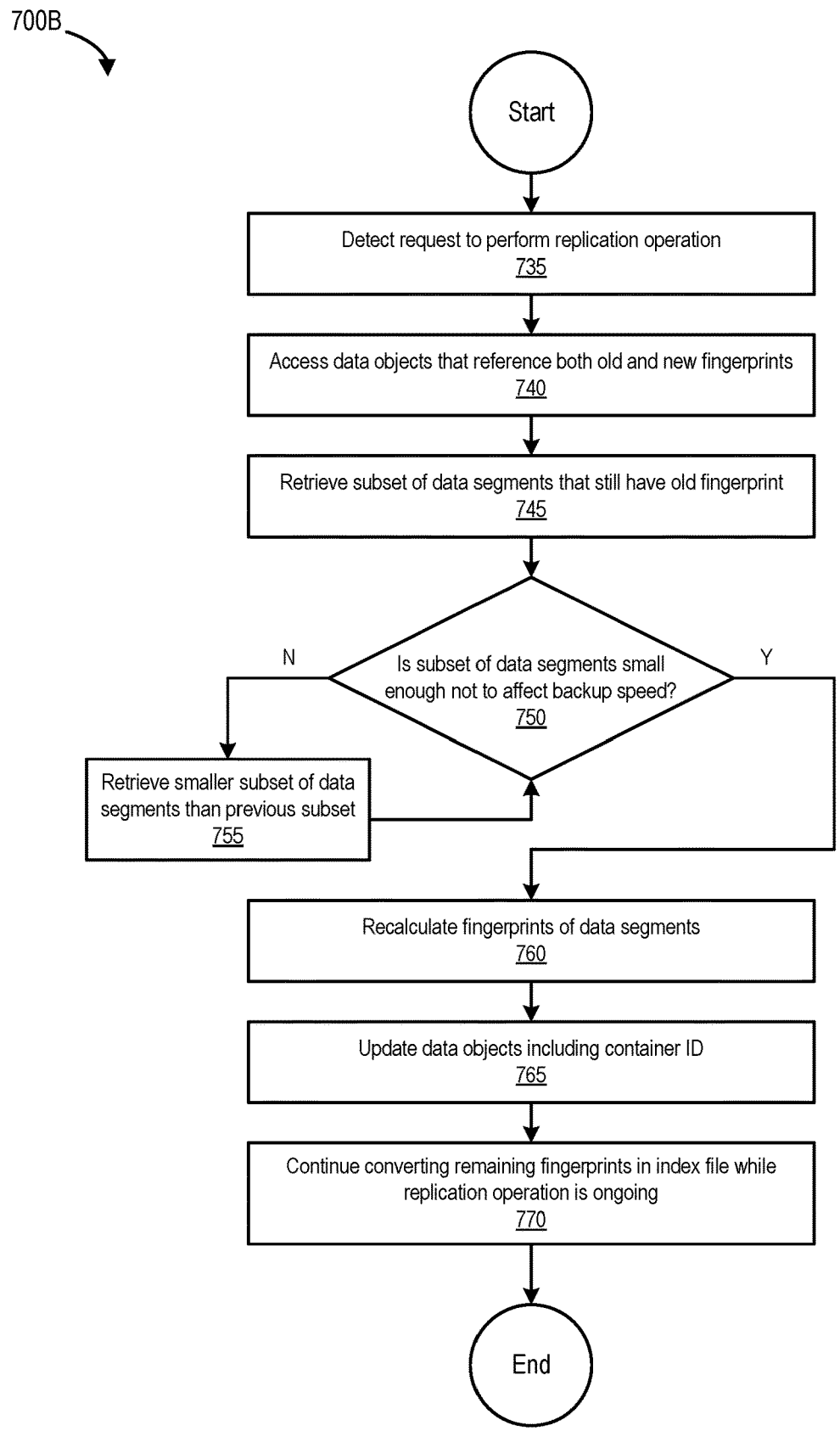
FIG. 7B is a flowchart that illustrates a method of performing data replication based on multiple fingerprints, according to one embodiment of the present invention.

FIG. 7B is a flowchart that illustrates a process for performing data replication during a change in a hashing algorithm. The process begins at 735 by detecting a request to perform a replication operation (e.g., from computing device 10 and/or client system). At 740, the process accesses data objects that reference both old (second) and new (first) fingerprints. At 745, the process retrieves a subset of data segments (e.g., data segments 130(1)-(2)) that still have the second fingerprint (e.g., entries 1 or 2 as shown in FIG. 4C).

At 750, the process determines if the subset of data retrieved is small enough not to affect backup speed (e.g., a configurable number of data segments having old fingerprints). For example, the determination whether the subset of data retrieved is small enough not to affect backup speed can be made by a predetermined threshold or by a system/network administrator. If the subset is not small enough (e.g., the subset negatively affects backup speed), the process, at 755, retrieves a smaller subset of data segments than the previously retrieved subset of data segments. For example, the process can retrieve a small a smaller subset of data segments so that backup speed is not adversely affected.

At 760, the process recalculates the fingerprints of the retrieved subset of data segments (e.g., using a first/new fingerprinting algorithm and/or process). At 765, the process updates data objects and the container ID associated with those subset of data segments. The process ends at 770 by continuing to convert the remaining fingerprints in the index file while the replication operation is ongoing. It will be appreciated that the replication operation/job can have a desirable data deduplication rate even when the generation (or conversion) of new fingerprints has not been fully completed. In this example, over time, all new replication backup images will reference the new (first) fingerprint.

In some embodiments, the replication operation illustrated in FIG. 7B is similar to the backup operation illustrated in FIG. 6A. In this example, the source side is a client system (e.g., computing device 10) and the target side is a server (e.g., deduplication server 210). However, unlike the client system in the backup operation (as illustrated in FIG. 6A), the client system performing the replication operation does not need to calculate fingerprints. For example, the source side first loads data object A which is to be replicated, and then retrieves data object B of the last full backup from the target side (e.g., from the server). The client system on the source side then compares a fingerprint list of data objects A and B (e.g., list A and list B). If a fingerprint exists in list A, but does not exist in list B, the client system queries the cache in the target side (e.g., deduplication server cache 410 as shown in FIG. 4A) just like the backup operation illustrated in FIG. 6A.

If a fingerprint does not exist is either list A or list B, and also does not exist in the target side cache (e.g., deduplication server cache 410), the client system reads the corresponding data segment from the source side (e.g., local storage 70 coupled to computing device 10) and transmits the data segment to the target side (e.g., to deduplication server 210). If the fingerprint associated with the data segment is in an old format (e.g., second fingerprint 110 calculated using the second fingerprinting process), the fingerprint is converted to the new format (e.g., first fingerprint 150 using the first fingerprinting process). However, to maintain the speed of the replication operation, the fingerprint need not be converted immediately. In one embodiment, to improve the speed of the replication operation, an entire batch of fingerprints can be queried to the target side (e.g., to deduplication server 210).

Example Computing Environment

Figure 8:
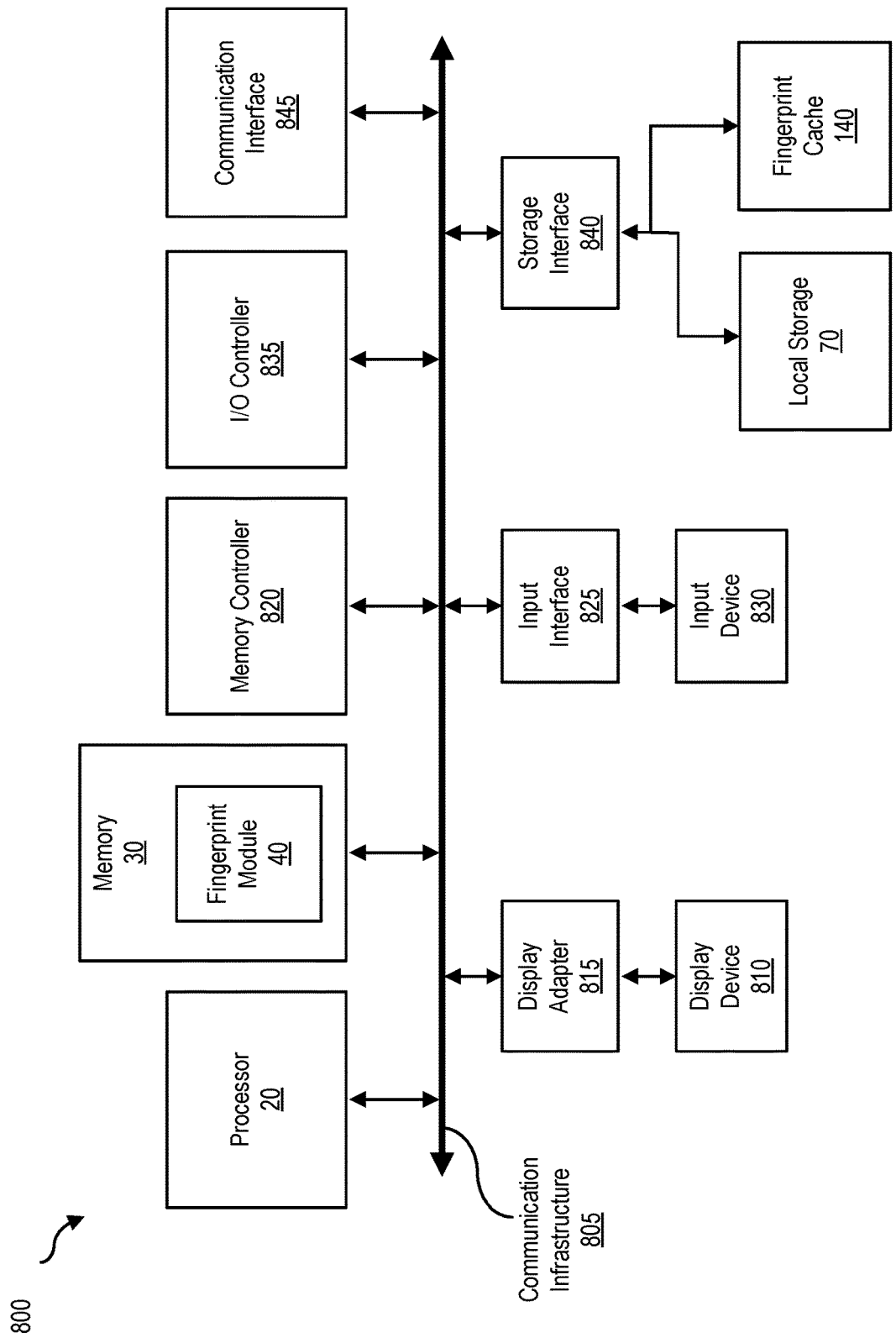
FIG. 8 is a block diagram of a computing system, according to one embodiment of the present invention.

FIG. 8 is a block diagram of a computing system 800 capable of implementing computing device 10 as described above. Computing system 800 broadly represents any single or multi-processor computing device or system capable of executing computer-readable instructions. Examples of computing system 800 include, without limitation, any one or more of a variety of devices including workstations, personal computers, laptops, client-side terminals, servers, distributed computing systems, handheld devices (e.g., personal digital assistants and mobile phones), network appliances, storage controllers (e.g., array controllers, tape drive controller, or hard drive controller), and the like. In its most basic configuration, computing system 800 may include at least one processor 20 and a memory 30. By executing the software that implements computing device 10, computing system 800 becomes a special purpose computing device that is configured to perform data deduplication (and other data operations) during a change in a hashing/fingerprinting algorithm.

Processor 20 generally represents any type or form of processing unit capable of processing data or interpreting and executing instructions. In certain embodiments, processor 20 may receive instructions from a software application or module. These instructions may cause processor 20 to perform the functions of one or more of the embodiments described and/or illustrated herein. For example, processor 20 may perform and/or be a means for performing all or some of the operations described herein. Processor 20 may also perform and/or be a means for performing any other operations, methods, or processes described and/or illustrated herein.

Memory 30 generally represents any type or form of volatile or non-volatile storage device or medium capable of storing data and/or other computer-readable instructions. Examples include, without limitation, random access memory (RAM), read only memory (ROM), flash memory, or any other suitable memory device. Although not required, in certain embodiments computing system 800 may include both a volatile memory unit and a non-volatile storage device. In one example, program instructions implementing a modifiable volume snapshot operation may be loaded into memory 30.

In certain embodiments, computing system 800 may also include one or more components or elements in addition to processor 20 and memory 30. For example, as illustrated in FIG. 8, computing system 800 may include a memory controller 820, an Input/Output (I/O) controller 835, and a communication interface 845, each of which may be interconnected via a communication infrastructure 805. Communication infrastructure 805 generally represents any type or form of infrastructure capable of facilitating communication between one or more components of a computing device. Examples of communication infrastructure 805 include, without limitation, a communication bus (such as an Industry Standard Architecture (ISA), Peripheral Component Interconnect (PCI), PCI express (PCIe), or similar bus) and a network.

Memory controller 820 generally represents any type or form of device capable of handling memory or data or controlling communication between one or more components of computing system 800. For example, in certain embodiments memory controller 820 may control communication between processor 20, memory 30, and I/O controller 835 via communication infrastructure 805. In certain embodiments, memory controller 820 may perform and/or be a means for performing, either alone or in combination with other elements, one or more of the operations or features described and/or illustrated herein.

I/O controller 835 generally represents any type or form of module capable of coordinating and/or controlling the input and output functions of a computing device. For example, in certain embodiments I/O controller 835 may control or facilitate transfer of data between one or more elements of computing system 800, such as processor 20, memory 30, communication interface 845, display adapter 815, input interface 825, and storage interface 840.

Communication interface 845 broadly represents any type or form of communication device or adapter capable of facilitating communication between computing system 800 and one or more additional devices. For example, in certain embodiments communication interface 845 may facilitate communication between computing system 800 and a private or public network including additional computing systems. Examples of communication interface 845 include, without limitation, a wired network interface (such as a network interface card), a wireless network interface (such as a wireless network interface card), a modem, and any other suitable interface. In at least one embodiment, communication interface 845 may provide a direct connection to a remote server via a direct link to a network, such as the Internet. Communication interface 845 may also indirectly provide such a connection through, for example, a local area network (such as an Ethernet network), a personal area network, a telephone or cable network, a cellular telephone connection, a satellite data connection, or any other suitable connection.

In certain embodiments, communication interface 845 may also represent a host adapter configured to facilitate communication between computing system 800 and one or more additional network or storage devices via an external bus or communications channel. Examples of host adapters include, without limitation, Small Computer System Interface (SCSI) host adapters, Universal Serial Bus (USB) host adapters, Institute of Electrical and Electronics Engineers (IEEE) 1394 host adapters, Serial Advanced Technology Attachment (SATA), Serial Attached SCSI (SAS), and external SATA (eSATA) host adapters, Advanced Technology Attachment (ATA) and Parallel ATA (PATA) host adapters, Fibre Channel interface adapters, Ethernet adapters, or the like. Communication interface 845 may also allow computing system 800 to engage in distributed or remote computing. For example, communication interface 845 may receive instructions from a remote device or send instructions to a remote device for execution.

As illustrated in FIG. 8, computing system 800 may also include at least one display device 810 coupled to communication infrastructure 805 via a display adapter 815. Display device 810 generally represents any type or form of device capable of visually displaying information forwarded by display adapter 815. Similarly, display adapter 815 generally represents any type or form of device configured to forward graphics, text, and other data from communication infrastructure 805 (or from a frame buffer, as known in the art) for display on display device 810.

As illustrated in FIG. 8, computing system 800 may also include at least one input device 830 coupled to communication infrastructure 805 via an input interface 825. Input device 830 generally represents any type or form of input device capable of providing input, either computer or human generated, to computing system 800. Examples of input device 830 include, without limitation, a keyboard, a pointing device, a speech recognition device, or any other input device.

As illustrated in FIG. 8, computing system 800 may also include local storage 70 and a fingerprint cache 140 coupled to communication infrastructure 805 via a storage interface 840. Local storage 70 and fingerprint cache 140 generally represent any type or form of storage devices or mediums capable of storing data and/or other computer-readable instructions. For example, local storage 70 and fingerprint cache 140 may include a magnetic disk drive (e.g., a so-called hard drive), a floppy disk drive, a magnetic tape drive, an optical disk drive, a flash drive, or the like. Storage interface 840 generally represents any type or form of interface or device for transferring and/or transmitting data between local storage 70, fingerprint cache 140, and other components of computing system 800.

In certain embodiments, local storage 70 and fingerprint cache 140 may be configured to read from and/or write to a removable storage unit configured to store computer software, data, or other computer-readable information. Examples of suitable removable storage units include, without limitation, a floppy disk, a magnetic tape, an optical disk, a flash memory device, or the like. Local storage 70 and fingerprint cache 140 may also include other similar structures or devices for allowing computer software, data, or other computer-readable instructions to be loaded into computing system 800. For example, local storage 70 and fingerprint cache 140 may be configured to read and write software, data, or other computer-readable information. Local storage 70 and fingerprint cache 140 may also be a part of computing system 800 or may be separate devices accessed through other interface systems.

Many other devices or subsystems may be connected to computing system 800. Conversely, all of the components and devices illustrated in FIG. 8 need not be present to practice the embodiments described and/or illustrated herein. The devices and subsystems referenced above may also be interconnected in different ways from that shown in FIG. 8.

Computing system 800 may also employ any number of software, firmware, and/or hardware configurations. For example, one or more of the embodiments disclosed herein may be encoded as a computer program (also referred to as computer software, software applications, computer-readable instructions, or computer control logic) on a computer-readable storage medium. Examples of computer-readable storage media include magnetic-storage media (e.g., hard disk drives and floppy disks), optical-storage media (e.g., CD- or DVD-ROMs), electronic-storage media (e.g., solid-state drives and flash media), and the like. Such computer programs can also be transferred to computing system 800 for storage in memory via a network such as the Internet or upon a carrier medium.

The computer-readable medium containing the computer program may be loaded into computing system 800. All or a portion of the computer program stored on the computer-readable medium may then be stored in memory 30 and/or various portions of local storage 70, and/or fingerprint cache 140. When executed by processor 20, a computer program loaded into computing system 800 may cause processor 20 to perform and/or be a means for performing the functions of one or more of the embodiments described and/or illustrated herein. Additionally or alternatively, one or more of the embodiments described and/or illustrated herein may be implemented in firmware and/or hardware. For example, computing system 800 may be configured as an application specific integrated circuit (ASIC) adapted to implement one or more of the embodiments disclosed herein.

Example Networking Environment

Figure 9:
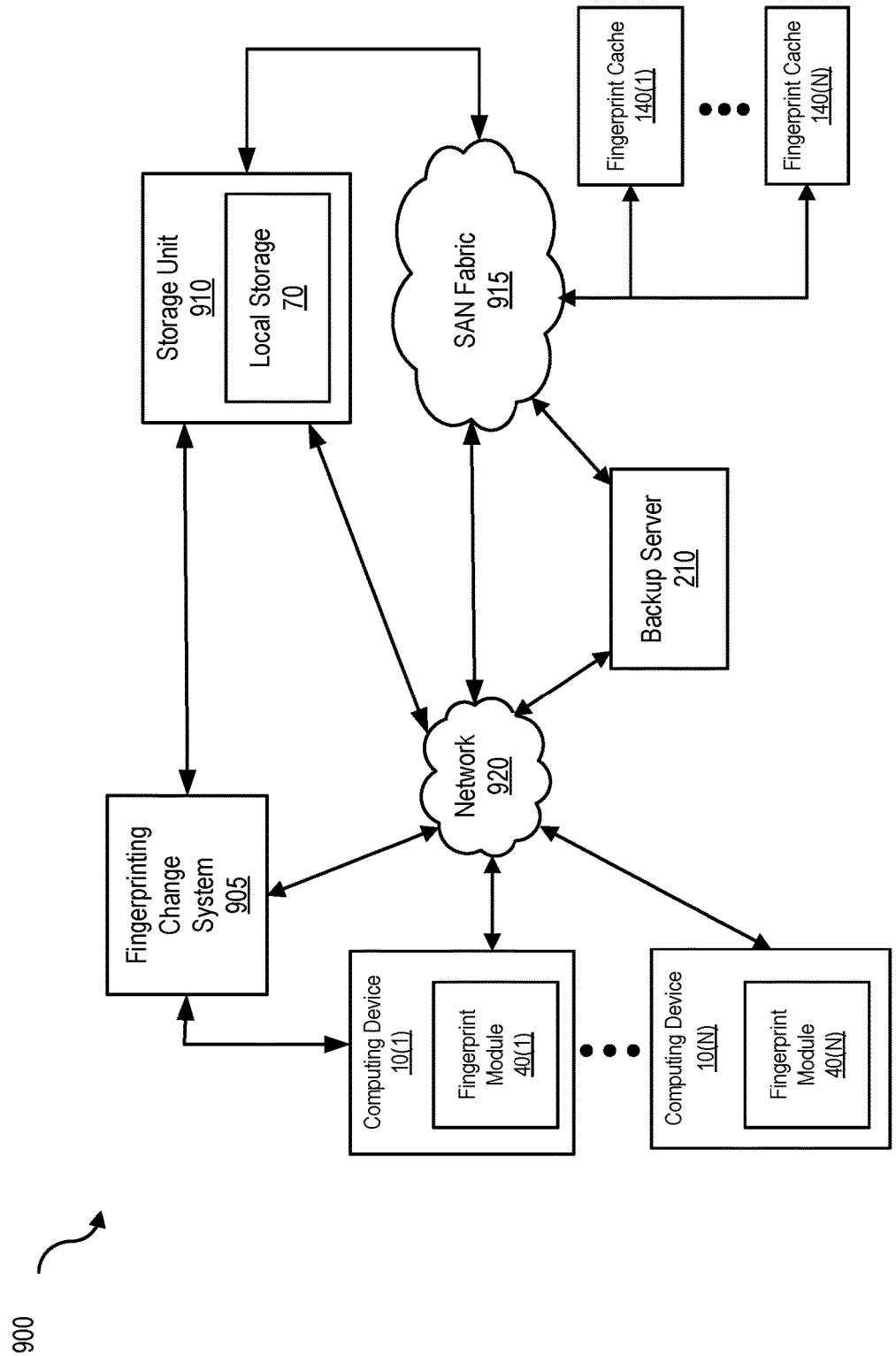
FIG. 9 is a block diagram of a network system, according to one embodiment of the present invention.

FIG. 9 is a block diagram of a network architecture 900 in which computing device 10 may be coupled to network 920. In certain embodiments, network-attached storage (NAS) devices may be configured to communicate with computing device 10 using various protocols, such as Network File System (NFS), Server Message Block (SMB), or Common Internet File System (CIFS).

Network 90 generally represents any type or form of computer network or architecture capable of facilitating communication between multiple computing devices. Network 90 may facilitate communication between computing device 10, fingerprint cache 140, and/or deduplication server 210. In certain embodiments, and with reference to computing system 800 of FIG. 8, a communication interface, such as communication interface 845 in FIG. 8, may be used to provide connectivity between computing device 10 and network 920. It should be noted that the embodiments described and/or illustrated herein are not limited to the Internet or any particular network-based environment. For example, network 920 can be a Storage Area Network (SAN).

In at least one embodiment, all or a portion of one or more of the embodiments disclosed herein may be encoded as a computer program and loaded onto and executed by computing device 10, fingerprint cache 140, deduplication server 210, or any combination thereof. All or a portion of one or more of the embodiments disclosed herein may also be encoded as a computer program, stored in computing device 10, or on fingerprint cache 140, and distributed over network 920.

In some examples, all or a portion of the computing device in FIG. 1A may represent portions of a cloud-computing or network-based environment. Cloud-computing environments may provide various services and applications via the Internet. These cloud-based services (e.g., software as a service, platform as a service, infrastructure as a service, etc.) may be accessible through a web browser or other remote interface. Various functions described herein may be provided through a remote desktop environment or any other cloud-based computing environment. In addition, one or more of the components described herein may transform data, physical devices, and/or representations of physical devices from one form to another. For example, a fingerprint module 40 may transform behavior of a computing device in order to cause the computing device to perform data deduplication (and other data operations) during a change in a hashing/fingerprinting algorithm.

Although the present invention has been described in connection with several embodiments, the invention is not intended to be limited to the specific forms set forth herein. On the contrary, it is intended to cover such alternatives, modifications, and equivalents as can be reasonably included within the scope of the invention as defined by the appended claims.

What is claimed is:

1. A computer-implemented method comprising:
   detecting that fingerprint generation for data stored in corresponding data segments is to be transitioned from a second fingerprinting process to a first fingerprinting process;
   retrieving a backup data object, wherein the backup data object comprises
      a data file having data stored in a plurality of data segments, and
      an index file, comprising a plurality of entries, wherein each of the plurality of entries comprises
         a data segment information field configured to store information identifying a location of the data stored in a corresponding data segment of the plurality of data segments, a first fingerprint field, configured to store a first fingerprint that is generated from data stored in the corresponding data segment using the first fingerprinting process, a second fingerprint field storing a second fingerprint that is generated from data stored in the corresponding data segment using the second fingerprinting process, and the first fingerprint and the second fingerprint are associated with one another in the index file for the corresponding data segment;

executing a backup operation, wherein the backup operation comprises receiving a data segment having data that is subject to a backup operation;

generating a second fingerprint using the data of the received data segment, wherein the second fingerprint is generated using the second fingerprinting process;

determining whether the second fingerprint generated from the data of the received data segment matches a second fingerprint of a data segment in the index file;

in response to a determination that the second fingerprint generated from the data in the received data segment fails to match a second fingerprint in the index file, generating a first fingerprint from the data in the received data segment, wherein the first fingerprint of the received data segment is generated using the first fingerprinting process, and storing the data in the received data segment, the first fingerprint, and corresponding data segment information in the backup data object.

2. The computer-implemented method of claim 1, wherein the first fingerprint and the second fingerprint are stored in association with one another by virtue of being stored in the index with the information identifying the data segment.

3. The computer-implemented method of claim 2, wherein the index file comprises at least one existing fingerprint that was generated from another data segment using the second fingerprinting process, and the at least one existing fingerprint is not associated with another fingerprint generated using the first fingerprinting process.

4. The computer-implemented method of claim 1, wherein the backup operation further comprises:

generating another fingerprint for data stored in another data segment of the plurality of data segments, using the first fingerprinting process.

5. The computer-implemented method of claim 4, wherein the generating is performed concurrently with the determining whether the second fingerprint generated from the data of the received data segment matches a second fingerprint of a data segment in the index file.

6. The computer-implemented method of claim 4, wherein the generating is performed subsequent to the determining, the generating is performed on a number of data segments of the plurality of data segments, and the number is configurable.

7. The computer-implemented method of claim 1, further comprising:

clearing the second fingerprints from the data backup object when the first fingerprints have been generated for substantially all of the data in the data backup object.

8. The computer-implemented method of claim 1, wherein the backup operation backs up data comprising the plurality of data segments, and the data object represents a last full backup of the data by virtue of each of the first fingerprints and/or the second fingerprints representing one of the plurality of data segments.

9. A computer system comprising:

one or more processors;

a non-transitory computer-readable storage medium coupled to the one or more processors; and a plurality of instructions, encoded in the computer-readable storage medium and configured to transition fingerprint generation for data stored in a corresponding data segment of a backup object from a second fingerprinting process to a first fingerprinting process during a backup operation comprising, retrieving a backup data object, wherein the backup data object comprises a data file having data stored in a plurality of data segments, and an index file, comprising a plurality of entries, wherein each of the plurality of entries comprises a data segment information field configured to store information identifying a location of the data stored in a corresponding data segment of the plurality of data segments, a first fingerprint field, configured to store a first fingerprint that is generated from data stored in the corresponding data segment using the first fingerprinting process, a second fingerprint field storing a second fingerprint that is generated from data stored in the corresponding data segment using the second fingerprinting process, the first fingerprint and the second fingerprint are associated with one another in the index file for the corresponding data segment;

receiving a data segment having data that is subject to a backup operation;

generating a second fingerprint using the data of the received data segment, wherein the second fingerprint is generated using the second fingerprinting process;

determining whether the second fingerprints generated from the data of the received data segment matches a second fingerprint of a data segment in the index file;

in response to a determination that the second fingerprint generated from the data in the received data segment fails to match a second fingerprint in the index file, generating a first fingerprint from the data in the received data segment, wherein the first fingerprint of the received data segment is generated using the first fingerprinting process, and storing the data in the received data segment, the first fingerprint, and corresponding data segment information in the backup data object.

10. The computer system of claim 9, wherein
the first fingerprint and the second fingerprint are stored in association with one another by virtue of being stored in the index file with the information identifying the data segment.

11. The computer system of claim 10, wherein
the index file comprises at least one existing fingerprint that was generated from another data segment using the second fingerprinting process, and
the at least one existing fingerprint is not associated with another fingerprint generated using the first fingerprinting process.

12. The computer system of claim 9, wherein the backup operation further comprises:
generating another fingerprint for data stored in another data segment of the plurality of data segments, using the first fingerprinting process.

13. The computer system of claim 12, wherein
the generating is performed concurrently with the determining.

14. The computer system of claim 12, wherein
the generating is performed subsequent to the determining,
the generating is performed on a number of data segments of the plurality of data segments, and
the number is configurable.

15. The computer system of claim 9, further comprising:
clearing the second fingerprints from the data backup object when the first fingerprints have been generated for substantially all data in the data backup object.

16. A computer-implemented method comprising:
performing a restoration operation, wherein the restoration comprises
retrieving a backup data object in which fingerprinting of data in corresponding data segments is being transitioned from fingerprints generated using a second fingerprinting process to fingerprints generated using a first fingerprinting process, wherein the backup data object comprises
a data file having data stored in a plurality of data segments, wherein the plurality of data segments comprise data of the backup data object,
an index file, comprising a plurality of entries, wherein each of the plurality of entries comprises
a data segment information field configured to store information identifying a location of the data stored in a corresponding data segment of the plurality of data segments,
a first fingerprint field, configured to store a first fingerprint that is generated from data stored in the corresponding data segment using a first fingerprinting process, and
a second fingerprint field storing a second fingerprint that is generated from data stored in the corresponding data segment using a second fingerprinting process,
the first fingerprint and the second fingerprint associated with one another in the index file for the corresponding data segment,
for each data segment of the plurality of data segments that is to be restored,
determining whether the index file comprises a fingerprint generated for a data segment using the second fingerprinting process,
in response to a determination that the index file comprises the fingerprint generated for the data segment using the second fingerprinting process, using the fingerprint to identify the data segment, and
in response to a determination that the index file comprises the fingerprint, generating another fingerprint using the data in the data segment, wherein the another fingerprint is generated using the first fingerprinting process, and
using the another fingerprint to identify the data segment, and restoring data for the data segment.

* * * * *